United States Patent
Ramsdell et al.

(10) Patent No.: US 9,614,686 B2
(45) Date of Patent: Apr. 4, 2017

(54) PROTECTED PREMISES NETWORK APPARATUS AND METHODS

(75) Inventors: Scott W. Ramsdell, Charlotte, NC (US); Jeffrey P. Markley, Superior, CO (US); Renee Storosh, Fairfax, VA (US); Chris Cholas, Frederick, CO (US); Srinivas Guduru, Ashburn, VA (US)

(73) Assignee: Time Warner Cable Enterprises LLC, New York, NY (US)

( * ) Notice: Subject to any disclaimer, the term of this patent is extended or adjusted under 35 U.S.C. 154(b) by 783 days.

(21) Appl. No.: 12/611,041

(22) Filed: Nov. 2, 2009

(65) Prior Publication Data

US 2011/0107404 A1  May 5, 2011

(51) Int. Cl.
*H04L 12/14* (2006.01)
*H04L 12/28* (2006.01)

(52) U.S. Cl.
CPC .......... *H04L 12/14* (2013.01); *H04L 12/1403* (2013.01); *H04L 12/2801* (2013.01)

(58) Field of Classification Search
CPC ........................... H04L 12/14; H04L 12/1403
USPC ................. 713/168–174, 182–186, 202; 709/217–219, 225, 229; 379/142.16
See application file for complete search history.

(56) References Cited

U.S. PATENT DOCUMENTS

| | | |
|---|---|---|
| 7,111,314 B2 | 9/2006 | Urdang et al. |
| 7,602,820 B2 | 10/2009 | Helms et al. |
| 7,603,529 B1 | 10/2009 | MacHardy |
| 7,757,261 B2 | 7/2010 | Addington et al. |
| 7,763,360 B2 | 7/2010 | Paul |
| 7,877,791 B2 * | 1/2011 | Childress .............. H04L 63/083 713/168 |
| 7,908,626 B2 | 3/2011 | Williamson et al. |
| 7,954,131 B2 | 5/2011 | Cholas et al. |
| 8,078,696 B2 | 12/2011 | LaJoie et al. |
| 2003/0018919 A1 * | 1/2003 | Arbab ................. H04L 63/0815 726/5 |
| 2003/0055962 A1 | 3/2003 | Freund et al. |
| 2003/0056217 A1 | 3/2003 | Brooks et al. |
| 2006/0130113 A1 | 6/2006 | Carlucci et al. |
| 2007/0005765 A1 * | 1/2007 | Lamb ................ H04L 29/12518 709/225 |
| 2007/0022459 A1 | 1/2007 | Gaebel, Jr. et al. |
| 2007/0217436 A1 | 9/2007 | Markley et al. |
| 2007/0220279 A1 | 9/2007 | Northcutt et al. |

(Continued)

*Primary Examiner* — Evans Desrosiers
(74) *Attorney, Agent, or Firm* — Gazdzinski & Associates, PC

(57) ABSTRACT

Apparatus and methods for enabling protected premises networking capabilities. In one embodiment, the premises network is a Multimedia over Coaxial Alliance (MoCA) network, and is secured by a requirement that devices use a password or key to access the network. The password may be given only to authorized devices. Information regarding a device may be utilized to associate the device with a particular premises network, and provide a password to authorized devices. The password is unique to the premises in one variant by being derived from a subscriber account. At least one of the devices requesting access to the premises network may comprise a gateway device. A home network utilizing existing coaxial cable in the premises is created between a plurality of authorized devices each receiving the password.

22 Claims, 18 Drawing Sheets

(56) References Cited

U.S. PATENT DOCUMENTS

| | | |
|---|---|---|
| 2008/0013612 A1 | 1/2008 | Miller et al. |
| 2008/0076412 A1 | 3/2008 | Khetawat et al. |
| 2008/0316960 A1 | 12/2008 | Daige et al. |
| 2009/0024550 A1* | 1/2009 | Wynn .................. H04W 12/06 706/46 |
| 2009/0059933 A1 | 3/2009 | Huang et al. |
| 2009/0140035 A1* | 6/2009 | Miller .................. G06Q 30/02 235/375 |
| 2009/0288145 A1 | 11/2009 | Huber et al. |
| 2010/0287585 A1* | 11/2010 | Frondal .................. H04N 7/162 725/31 |
| 2010/0312826 A1 | 12/2010 | Sarosi et al. |
| 2010/0313225 A1 | 12/2010 | Cholas et al. |
| 2011/0103374 A1 | 5/2011 | LaJoie et al. |
| 2011/0107436 A1 | 5/2011 | Cholas et al. |
| 2011/0116442 A1 | 5/2011 | Caldwell et al. |

* cited by examiner

PROTECTED PREMISES NETWORK APPARATUS AND METHODS

RELATED APPLICATIONS

This application is related to co-owned and co-pending U.S. application Ser. No. 12/611,006 filed contemporaneously herewith on Nov. 2, 2009 and entitled "Apparatus and Methods for Device Authorization in a Premises Network", incorporated herein by reference in its entirety

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of content and/or data delivery over a network. More particularly, the present invention is related to apparatus and methods for protecting the distribution of programming content, media, data and other information services within a user premises (e.g., residence, enterprise, etc.) network.

2. Description of Related Technology

Recent advances in digital information processing have made a range of services and functions available for delivery to consumers at their premises for very reasonable prices or subscription fees. These services and functions include digital broadcast programming (movies, etc.), digital video-on-demand (VOD), personal video recorder (PVR), Internet Protocol television (IPTV), digital media playback and recording, as well high speed internet access and IP-based telephony (e.g., VoIP). Other services available to network users include access to and recording of digital music (e.g., MP3 files), as well local area networking (including wireline and wireless local area networks) for distributing these services throughout the user's premises, and beyond.

Currently, in the context of content delivery networks such as cable, hybrid fiber copper (HFCu), and satellite networks, many of these services are provided and delivered to the user via a variety of different equipment environments including, inter alia, cable modems and computers, set-top boxes, digital video recorders (DVRs), PSTNs, cellular telephones/smartphones, PDAs, and portable digital music devices such as the Apple iPod™. Additionally, the services associated with such technology are typically provided by multiple vendors including e.g., a cable or satellite service provider (e.g., MSO), cellular service provider (CSP), wireless service provider (WSP), VoIP service provider, music download service, Internet service provider (ISP), PSTN telephone service, etc.

The Multimedia over Coax Alliance (MoCA)™ develops specifications for home networking over in-home coaxial cable. MoCA makes use of previously unused bandwidth available on in-home coaxial cable to deliver voice, video and data without requiring new connections, wiring, or point of entry devices. Many homes have existing coaxial cable installed throughout their homes. MoCA enables homeowners to utilize this existing coaxial cable infrastructure as a networking system in order to deliver other data and content within the home.

Within a content delivery network, there has been an appreciable increase in the deployment of devices having MoCA capabilities (such as e.g., set-top-boxes for use in a multi-room DVR scenario and gateway boxes), including so-called "retail" devices (devices which are not particularly owned or managed by an MSO, but rather purchased or leased by the subscriber from a third party vendor).

Currently, systems implementing MoCA networking communications employ a user-created password for gaining access to a network. The user-created password is entered by the user and stored in each of the devices which the user desires to use in accessing the MoCA network. The same password must be provided for each device requesting access to the MoCA network. However, a user generated, entered, and stored password is highly susceptible to loss, user error, and fraud (e.g., stealing). Thereby rendering content unprotected from mass, unauthorized distribution outside of the user's network.

Accordingly, there is a need for methods and apparatus to protect video and data services on the MoCA network. Specifically, methods are needed for preventing devices from interfering with the ability of a particular MoCA network from delivering services only to authorized devices. Moreover, such methods and apparatus would additionally prevent retail devices from receiving or distributing content without joining the MSO-maintained network (i.e., stealing content).

SUMMARY OF THE INVENTION

The present invention satisfies the foregoing needs by providing, inter alia, improved apparatus and methods for protected premises networking.

In a first aspect of the invention, a method for enabling premises networking capabilities is disclosed. In one embodiment, the method comprises: receiving a request for a security feature to gain access to the premises network from at least one client device; verifying the at least one client device; querying a database for a security feature associated with the at least one client device; and transmitting the security feature to the at least one client device. The security feature is used by the at least one client device to gain access to the premises network.

In one variant, the security feature comprises a password, and the request comprises a media access control (MAC) address of the at least one client device.

In a second aspect of the invention, a premises network-capable device for use in a content delivery network is disclosed. In one embodiment, the device comprises: a network interface for communication with the content delivery network; at least one premises interface for communication with one or more devices within the premises network; a storage entity; and a digital processor configured to run at least one client application thereon. The application is configured to, when executed: receive at least one entitlement message; in response to the receipt of the entitlement message, send a request for a premises network password; receive the premises network password; and utilize the premises network password to establish communication within the premises network.

In a third aspect of the invention, a server apparatus is disclosed. In one embodiment, the apparatus comprises: a network interface; a storage apparatus; and a processor in data communication with the interface and storage apparatus, the processor configured to run at least a software application thereon. The software application is configured to: receive a password request from a client device in communication with the network; utilize information in the password request to query a first database for a user account associated with the client device; utilize the user account information to query a second database for the password; retrieve the password; and transmit the password to the requesting client device via the network.

In a fourth aspect of the invention, a method for enabling at least one of a plurality of gateway apparatus in a content delivery network to participate in a premises network comprising one or more of a plurality of client devices is disclosed. In one embodiment, the method comprises: receiving, at an entity of the headend, a request for an extensible markup language (XML) file comprising information associated with the premises network from the at least one gateway apparatus; directing a search of a database for the XML file using information obtained from the request; and providing the XML file to the at least one requesting gateway apparatus, the at least one gateway apparatus using the information associated with the premises network to join the premises network.

In a fifth aspect of the invention, a premises gateway apparatus is disclosed. In one embodiment, the gateway apparatus comprises: a network interface configured to transmit and receive signals to and from a content delivery network; a storage apparatus; and a processor configured to run at least a software application thereon. The software application is configured to: receive a markup language configuration file; and utilize a subscriber-specific premises network password contained in the configuration file to communicate with a plurality of devices on the premises network.

In a sixth aspect of the invention, a headend apparatus for managing premises networking among a plurality of client devices and at least one premises gateway apparatus is disclosed. In one embodiment, the management apparatus comprises: at least one network interface for communication with the content based network; and at least one processor configured to run at least a software application thereon. The software application is configured to: receive a request from the at least one premises gateway apparatus for premises network-specific information; identify from among a plurality of stored extensible markup language (XML) files, at least one XML file comprising the premises network-specific information; and provide the XML file to the at least one premises gateway apparatus.

In a seventh aspect of the invention, a method of operating a premises device is disclosed. In one embodiment, the method comprises: placing the premises device in data communication with a premise network, at least one component of the premises network being in communication with a content-distribution network; substantially in response to the act of placing, causing the premises device to automatically: issue a request for security information to the content distribution network via the at least one component, the request comprising information uniquely identifying the premises device and being used by the content distribution network to authenticate the premises device; receive the security information from the content distribution network; and utilize the security information to gain access to one or more features of the premises network.

In an eighth aspect of the invention, a computer readable apparatus is disclosed. In one embodiment, the apparatus comprises a storage medium having a computer program stored thereon. The computer program is configured to implement password or key request and receipt functionality on a client device within a content delivery (e.g., cable or satellite) network.

In a ninth aspect of the invention, a content delivery network having a plurality of associated premises networks is disclosed. In one embodiment, the content delivery network comprises a cable or satellite distribution network, and the premises networks comprise MoCA-enabled networks having password or key protection managed by one or more entities of the distribution network headend.

In a further aspect of the disclosure, a method of operating a premises device is disclosed. In one embodiment, the method includes: (i) placing the premises device in data communication with a premises network that has at least one component in communication with a content distribution network; (ii) causing the premises device to automatically: (1) receive at least one entitlement message from a network controller disposed at a headend of the content distribution network; (2) in response to the receipt of the entitlement message, send a request for a security to a server disposed at the headend of the content delivery network; (3) receive the security information from the content distribution network; (4) utilize the security information to gain access to one or more features of the premises network; and (5) determine that another premises device is in communication with the premises network; and (iii) upon authentication of the other premises device, transmit the security information to the other premises device.

In one variant, the entitlement message is implemented to inform the premises device that the premises device is entitled to services on the premises network. In another variant, the security information includes one or more restrictions associated therewith, and the transmission is implemented to enable the premises device to share content and associated metadata with the another premises device for a certain duration via the premises network (e.g., a duration based at least in part on the one or more restrictions). In yet another variant, the determination includes a detection of the other premises device via a physical connection.

In one implementation, the security information includes a password generated by a server apparatus via use of at least user account information as seed information for an algorithm, and the user account information is associated with at least the premises device.

In a further aspect of the disclosure, a non-transitory computer-readable apparatus is disclosed. In one embodiment, the non-transitory computer-readable apparatus includes media configured to store a computer program thereon. In one variant, the computer program includes a plurality of instructions which are configured to, when executed by a processor apparatus: (i) receive at least one entitlement message from a network controller disposed at a content delivery network headend, the entitlement message being implemented to indicate that a premises network-capable device is entitled to services on a premises network; (ii) in response to the receipt of the entitlement message, send a request for a premises network password to a server disposed at the content delivery network headend; (iii) receive the premises network password from the server, where the received premises network password includes one or more restrictions associated therewith; (iv) identify at least two client devices within the premises network which are also entitled to receive services on the premises network; and (v) transmit the premises network password to the identified at least two devices.

In one implementation, the transmission enables communication to be established within the premises network between the identified at least two devices. The communication established within the premises network enables media content and associated metadata to be shared between the identified two devices for e.g., a certain duration via the premises network.

In another implementation, the received premises network password includes a password generated by the server via use of at least user account information as seed information for an algorithm, and the user account information is associated with the identified devices.

Other features and advantages of the present invention will immediately be recognized by persons of ordinary skill in the art with reference to the attached drawings and detailed description of exemplary embodiments as given below.

BRIEF DESCRIPTION OF THE DRAWINGS

FIG. 3b is a diagram illustrating a typical communication flow for providing protected networking capabilities to premises devices according to the method of FIG. 3a.

FIG. 4b is a diagram illustrating a typical communication flow for providing protected networking capabilities to a gateway device according to the method of FIG. 4a.

FIG. 9b is a logical flow diagram illustrating one exemplary method for providing protected networking capabilities to the premises network illustrated in FIG. 9a.

DETAILED DESCRIPTION OF THE INVENTION

Figure 1:
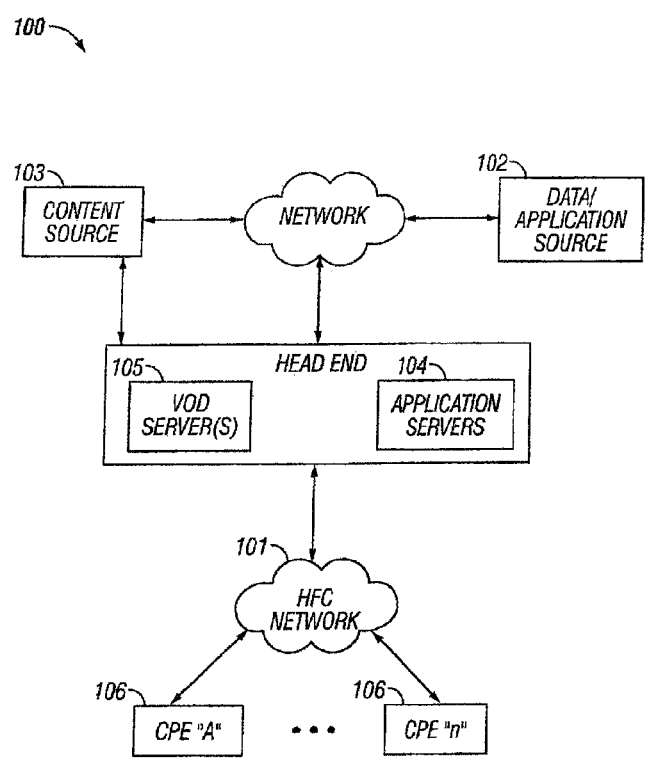
FIG. 1 is a functional block diagram illustrating an exemplary HFC cable network configuration useful with the present invention.

Reference is now made to the drawings wherein like numerals refer to like parts throughout.

As used herein, the term "application" refers generally to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein, the terms "client device" and "end user device" include, but are not limited to, set-top boxes (e.g., DSTBs), personal computers (PCs), and minicomputers, whether desktop, laptop, or otherwise, and mobile devices such as handheld computers, PDAs, personal media devices (PMDs), such as for example an iPod™, or Motorola ROKR, and smartphones.

As used herein, the term "codec" refers to an video, audio, or other data coding and/or decoding algorithm, process or apparatus including, without limitation, those of the MPEG (e.g., MPEG-1, MPEG-2, MPEG-4, etc.), Real (RealVideo, etc.), AC-3 (audio), DiVX, XViD/ViDX, Windows Media Video (e.g., WMV 7, 8, or 9), ATI Video codec, or VC-1 (SMPTE standard 421M) families.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (e.g., BREW), and the like.

The terms "Customer Premises Equipment (CPE)" and "host device" refer to any type of electronic equipment located within a customer's or user's premises and connected to a network. The term "host device" refers generally to a terminal device that has access to digital television content via a satellite, cable, or terrestrial network. The host device functionality may be integrated into a digital television (DTV) set. The term "customer premises equipment" (CPE) includes such electronic equipment such as set-top boxes (e.g., DSTBs), televisions, cable modems (CMs), embedded multimedia terminal adapters (eMTAs), whether stand-alone or integrated with other devices, Digital Video Recorders (DVR), gateway storage devices (Furnace), and ITV Personal Computers.

As used herein, the term "display" means any type of device adapted to display information, including without limitation CRTs, LCDs, TFTs, plasma displays, LEDs, incandescent and fluorescent devices. Display devices may also include less dynamic devices such as, for example, printers, e-ink devices, and the like.

As used herein, the term "DVR" (digital video recorder) refers generally to any type or recording mechanism and/or software environment whereby content sent over a network can be recorded and selectively recalled. Such DVR may be dedicated in nature, or part of a non-dedicated or multi-function system.

As used herein, the term "DOCSIS" refers to any of the existing or planned variants of the Data Over Cable Services Interface Specification, including for example DOCSIS versions 1.0, 1.1, 2.0 and 3.0. DOCSIS (version 1.0) is a standard and protocol for internet access using a "digital" cable network. DOCSIS 1.1 is interoperable with DOCSIS 1.0, and has data rate and latency guarantees (VoIP), as well as improved security compared to DOCSIS 1.0. DOCSIS 2.0 is interoperable with 1.0 and 1.1, yet provides a wider upstream band (6.4 MHz), as well as new modulation formats including TDMA and CDMA. It also provides symmetric services (30 Mbps upstream).

As used herein, the term "headend" refers generally to a networked system controlled by an operator (e.g., an MSO) that distributes programming to MSO clientele using client devices. Such programming may include literally any information source/receiver including, inter alia, free-to-air TV channels, pay TV channels, interactive TV, and the Internet.

As used herein, the terms "Internet" and "internet" are used interchangeably to refer to inter-networks including, without limitation, the Internet.

As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.).

As used herein, the term "network interface" refers to any signal, data, or software interface with a component, network or process including, without limitation, those of the FireWire (e.g., FW400, FW800, etc.), USB (e.g., USB2), Ethernet (e.g., 10/100, 10/100/1000 (Gigabit Ethernet), 10-Gig-E, etc.), MoCA, Serial ATA (e.g., SATA, e-SATA, SATAII), Ultra-ATA/DMA, Coaxsys (e.g., TVnet™), radio frequency tuner (e.g., in-band or OOB, cable modem, etc.), Wi-Fi (802.11a, b, g, n), WiMAX (802.16), PAN (802.15), or IrDA families.

As used herein, the term "QAM" refers to modulation schemes used for sending signals over cable networks. Such modulation scheme might use any constellation level (e.g. QPSK, 16-QAM, 64-QAM, 256-QAM, etc.) depending on details of a cable network. A QAM may also refer to a physical channel modulated according to the schemes.

As used herein, the term "server" refers to any computerized component, system or entity regardless of form which is adapted to provide data, files, applications, content, or other services to one or more other devices or entities on a computer network.

As used herein, the term "storage device" refers to without limitation computer hard drives, DVR device, memory RAID devices or arrays, optical media (e.g., CD-ROMs, Laserdiscs, Blu-Ray, etc.), or any other devices or media capable of storing content or other information.

As used herein, the term "Wi-Fi" refers to, without limitation, any of the variants of IEEE-Std. 802.11 or related standards including 802.11a/b/g/n.

As used herein, the term "wireless" means any wireless signal, data, communication, or other interface including without limitation Wi-Fi, Bluetooth, 3G, HSDPA/HSUPA, TDMA, CDMA (e.g., IS-95A, WCDMA, etc.), FUSS, DSSS, GSM, PAN/802.15, WiMAX (802.16), 802.20, narrowband/FDMA, OFDM, PCS/DCS, analog cellular, CDPD, satellite systems, millimeter wave or microwave systems, acoustic, and infrared (i.e., IrDA).

Overview

The present invention provides, inter alia, methods and apparatus for selectively enabling premises networking capabilities. In one embodiment, the premises network may be established via the utilization of secret information (e.g., a password or key), which is given only to authorized devices.

A client device entitled to access a premises network (e.g., a MoCA network) may be triggered to request such access from a network entity, such as a server at the network headend. The server utilizes information in the request message issued from the client device to associate that device with a subscriber account, and verify that the device is entitled to access the network. A password or other security feature unique to the subscriber account may then be transmitted to the device, enabling the client device to access the premises network.

A premises gateway device entitled to access the premises (e.g., MoCA) network may request a password or security feature from the network entity as well. The gateway device may receive the password/security feature from a configuration file held at a network headend entity (e.g., server). In a further embodiment, the gateway device may transmit the password/security feature on to other devices connected to or in data communication with the gateway.

Accordingly, the home network utilizing existing coaxial cable in the premises is created between the gateway device and a plurality of client devices at the premises. The network may use e.g., an Ethernet-to-coaxial bridge technology based on the MoCA specification. This allows client devices and DVRs to connect and share content with the gateway and with one another, and also allows the network operator (e.g., MSO) to control and manage the premises coaxial network remotely.

DETAILED DESCRIPTION OF EXEMPLARY EMBODIMENTS

Exemplary embodiments of the apparatus and methods of the present invention are now described in detail. While these exemplary embodiments are described in the context of the aforementioned hybrid fiber coax (HFC) cable system architecture having an multiple systems operator (MSO), digital networking capability, and plurality of client devices/CPE, the general principles and advantages of the invention may be extended to other types of networks and architectures, whether broadband, narrowband, wired or wireless, or otherwise, the following therefore being merely exemplary in nature. For example, the premises network (MoCA or otherwise) may be used in conjunction with a satellite receiver and delivery network, or alternatively an IP-based delivery network. A WiMAX (IEEE Std. 802.16) broadband delivery network could also be utilized. Hence, the premises network is largely agnostic to the delivery network used to service it with content and security features (described in greater detail below).

It will also be appreciated that while described generally in the context of a consumer (i.e., home) end user domain or premises, the present invention may be readily adapted to other types of environments (e.g., commercial/enterprise, government/military, healthcare facility, etc.) as well. Myriad other applications are possible.

It is further noted that while described primarily in the context of a cable delivery system with 6 MHz RF channels, the present invention is applicable to literally any network topology or paradigm, and any frequency/bandwidth, such as for example 8 MHz channels. Furthermore, as referenced above, the invention is in no way limited to traditional cable system frequencies (i.e., below 1 GHz), and in fact may be used with systems that operate above 1 GHz band in center frequency or bandwidth, to include without limitation so-called ultra-wideband systems.

Also, while certain aspects are described primarily in the context of the well-known IP or Internet Protocol (described in, inter alia, RFC 791 and 2460), it will be appreciated that the present invention may utilize other types of protocols (and in fact bearer networks to include other internets and intranets) to implement the described functionality.

Other features and advantages of the present invention will immediately be recognized by persons of ordinary skill in the art with reference to the attached drawings and detailed description of exemplary embodiments as given below.
Network—

FIG. 1 illustrates a typical content delivery network configuration with which the apparatus and methods of the present invention may be used. The various components of the network 100 include (i) one or more data and application origination points 102; (ii) one or more content sources 103; (iii) one or more application distribution servers 104; (iv) one or more VOD servers 105, and (v) customer premises equipment (CPE) 106. The distribution server(s) 104, VOD servers 105 and CPE(s) 106 are connected via a bearer (e.g., HFC) network 101. A simple architecture comprising one of each of the aforementioned components 102, 104, 105, 106 is shown in FIG. 1 for simplicity, although it will be recognized that comparable architectures with multiple origination points, distribution servers, VOD servers, and/or CPE devices (as well as different network topologies) may be utilized consistent with the invention. For example, the headend architecture of FIG. 1a (described in greater detail below) may be used.

The data/application origination point 102 comprises any medium that allows data and/or applications (such as a VOD-based or "Watch TV" application) to be transferred to a distribution server 104. This can include for example a third party data source, application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill.

The application distribution server 104 comprises a computer system where such applications can enter the network system. Distribution servers are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other locations, whether local or remote to the distribution server 104) that can be accessed by a distribution server 104.

Figure 1A:
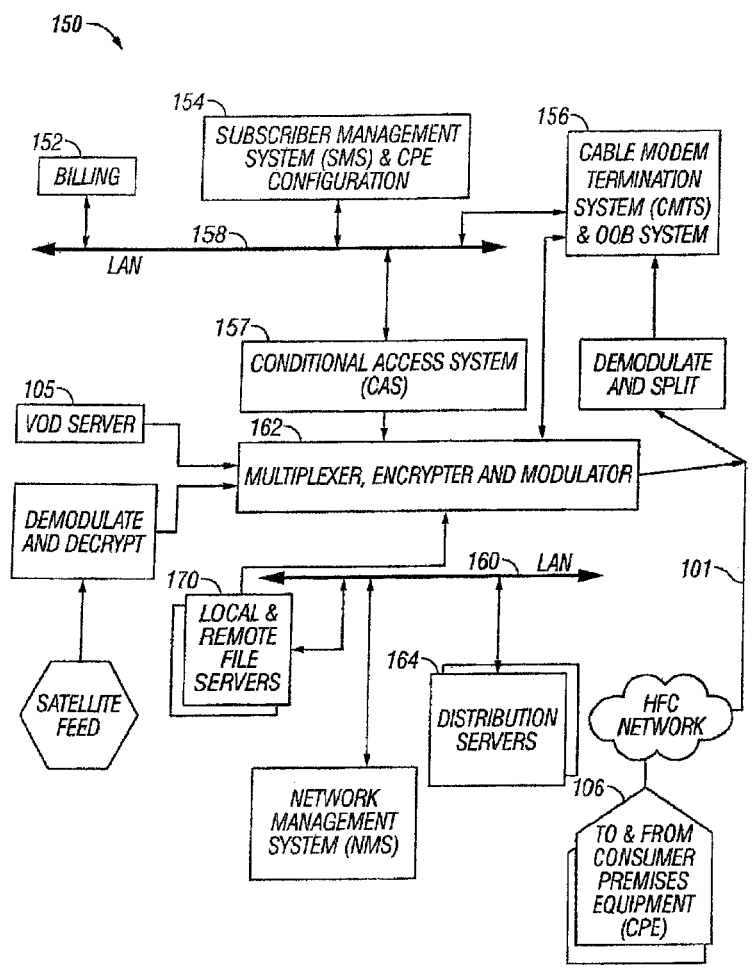
FIG. 1a is a functional block diagram illustrating one exemplary HFC cable network headend configuration useful with the present invention.

Referring now to FIG. 1a, one exemplary embodiment of a headend architecture useful with the present invention is described. As shown in FIG. 1a, the headend architecture 150 comprises typical headend components and services including billing module 152, subscriber management system (SMS) and CPE configuration management module 154, cable-modem termination system (CMTS) and OOB system 156, as well as LAN(s) 158, 160 placing the various components in data communication with one another. It will be appreciated that while a bar or bus LAN topology is illustrated, any number of other arrangements as previously referenced (e.g., ring, star, etc.) may be used consistent with the invention. It will also be appreciated that the headend configuration depicted in FIG. 1a is high-level, conceptual architecture and that each MSO may have multiple headends deployed using custom architectures.

Figure 1B:
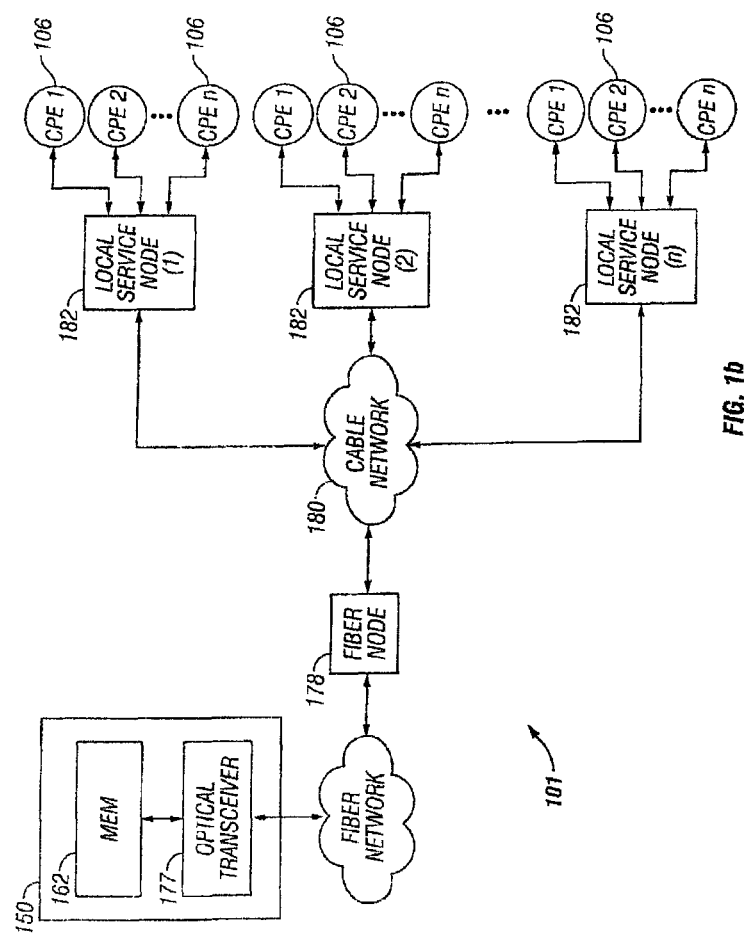
FIG. 1b is a functional block diagram illustrating one exemplary local service node configuration useful with the present invention.

The exemplary architecture 150 of FIG. 1a further includes a multiplexer-encrypter-modulator (MEM) 162 coupled to the HFC network 101 adapted to process or condition content for transmission over the network. The distribution servers 164 are coupled to the LAN 160, which provides access to the MEM 162 and network 101 via one or more file servers 170. The VoD servers 105 are coupled to the LAN 160 as well, although other architectures may be employed (such as for example where the VoD servers are associated with a core switching device such as an 802.3z Gigabit Ethernet device). As previously described, information is carried across multiple channels. Thus, the headend must be adapted to acquire the information for the carried channels from various sources. Typically, the channels being delivered from the headend 150 to the CPE 106 ("downstream") are multiplexed together in the headend as previously described, and sent to neighborhood hubs (FIG. 1b) via a variety of interposed network components.

Figure 1C:
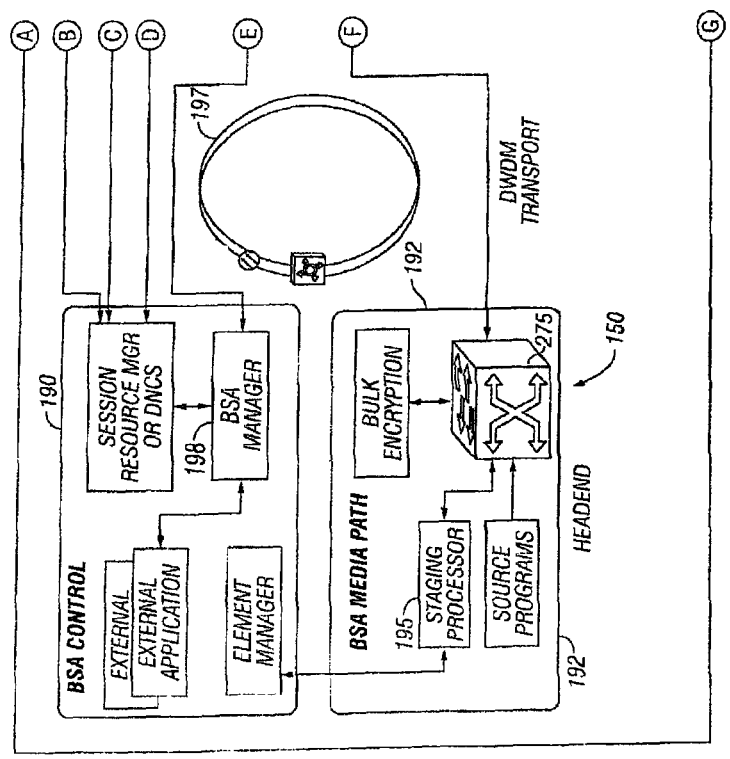
FIG. 1c is a functional block diagram illustrating one exemplary broadcast switched architecture (BSA) network useful with the present invention.
Figure 1C:
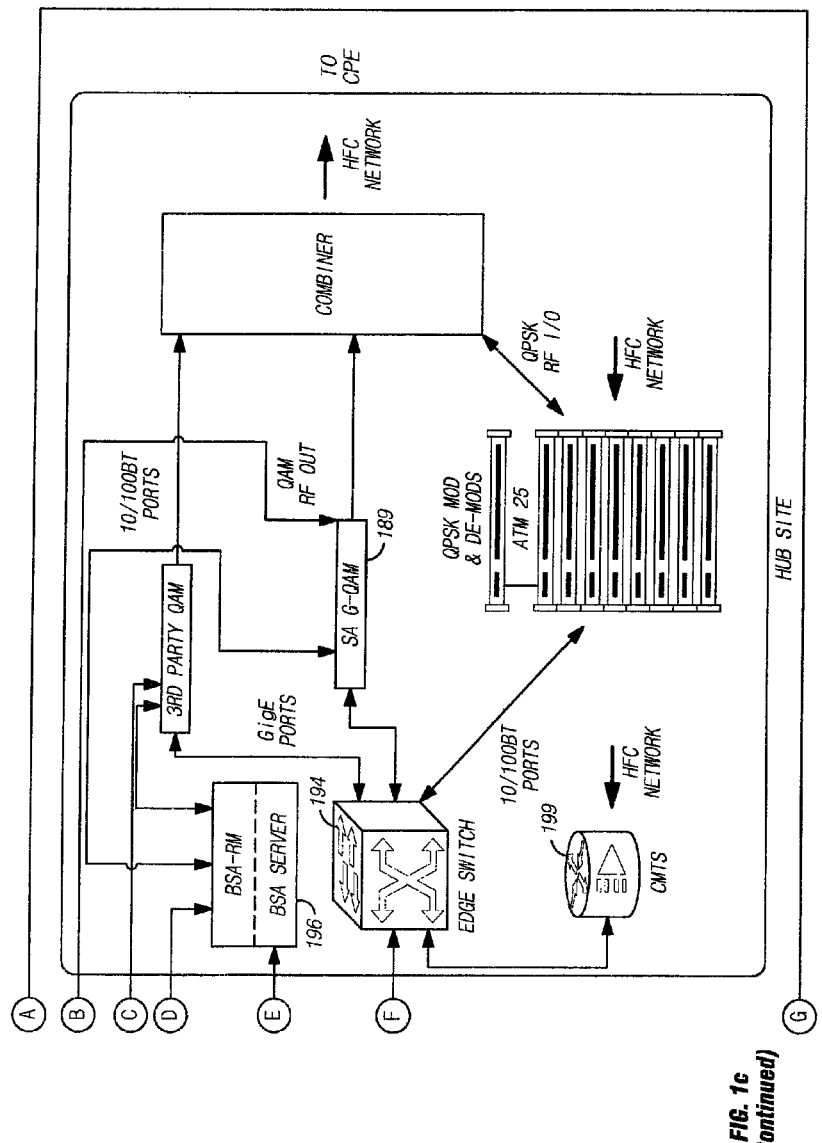

It will also be recognized, however, that the multiplexing operation(s) need not necessarily occur at the headend 150 (e.g., in the aforementioned MEM 162). For example, in one variant, at least a portion of the multiplexing is conducted at a BSA switching node or hub (see discussion of FIG. 1c provided subsequently herein). As yet another alternative, a multi-location or multi-stage approach can be used, such as that described in co-owned U.S. patent application Ser. No. 11/048,334, entitled "APPARATUS AND METHODS FOR MULTI-STAGE MULTIPLEXING IN A NETWORK", and issued as U.S. Pat. No. 7,602,820 on Oct. 13, 2009, incorporated herein by reference in its entirety, which discloses inter alia improved multiplexing apparatus and methods that allow such systems to dynamically compensate for content (e.g., advertisements, promotions, or other programs) that is inserted at a downstream network node such as a local hub, as well as "feed back" and "feed forward" mechanisms for transferring information between multiplexing stages.

Content (e.g., audio, video, data, files, etc.) is provided in each downstream (in-band) channel associated with the relevant service group. To communicate with the headend or intermediary node (e.g., hub server), the CPE 106 may use the out-of-band (OOB) or DOCSIS channels and associated protocols. The OCAP 1.0, 2.0, 3.0 (and subsequent) specification provides for exemplary networking protocols both downstream and upstream, although the invention is in no way limited to these approaches.

It will also be recognized that the multiple servers (broadcast, VoD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

"Switched" Networks—

FIG. 1c illustrates an exemplary "switched" network architecture also useful with the premises gateway apparatus and features of the present invention. While a so-called "broadcast switched architecture" or BSA network is illustrated in this exemplary embodiment, it will be recognized that the present invention is in no way limited to such architectures.

Switching architectures allow improved efficiency of bandwidth use for ordinary digital broadcast programs. Ideally, the subscriber is unaware of any difference between programs delivered using a switched network and ordinary streaming broadcast delivery.

FIG. 1c shows the implementation details of one exemplary embodiment of this broadcast switched network architecture. Specifically, the headend 150 contains switched broadcast control and media path functions 190, 192; these element cooperating to control and feed, respectively, downstream or edge switching devices 194 at the hub site which are used to selectively switch broadcast streams to various service groups. A BSA server 196 is also disposed at the hub site, and implements functions related to switching and bandwidth conservation (in conjunction with a management entity 198 disposed at the headend). An optical transport ring 197 is utilized to distribute the dense wave-division multiplexed (DWDM) optical signals to each hub in an efficient fashion.

Co-owned U.S. patent application Ser. No. 09/956,688 filed Sep. 20, 2001, issued as U.S. Pat. No. 8,713,623 on Apr. 29, 2014, and entitled "Technique for Effectively Providing Program Material in a Cable Television System", incorporated herein by reference in its entirety, describes one exemplary broadcast switched digital architecture useful with the present invention, although it will be recognized by those of ordinary skill that other approaches and architectures may be substituted.

In addition to "broadcast" content (e.g., video programming), the systems of FIGS. 1a and 1c (and FIG. 1d, described below) also deliver Internet data services using the Internet protocol (IP), although other protocols and transport mechanisms of the type well known in the digital communication art may be substituted. One exemplary delivery paradigm comprises delivering MPEG-based video content, with the video transported to user PCs (or IP-based STBs) over the aforementioned DOCSIS channels comprising MPEG (or other video codec such as H.264 or AVC) over IP over MPEG. That is, the higher layer MPEG- or other encoded content is encapsulated using an IP protocol, which then utilizes an MPEG packetization of the type well known in the art for delivery over the RF channels. In this fashion, a parallel delivery mode to the normal broadcast delivery exists; i.e., delivery of video content both over traditional downstream QAMs to the tuner of the user's STB or other receiver device for viewing on the television, and also as packetized IP data over the DOCSIS QAMs to the user's PC or other IP-enabled device via the user's cable modem.

Referring again to FIG. 1c, the IP packets associated with Internet services are received by edge switch 194, and forwarded to the cable modem termination system (CMTS) 199. The CMTS examines the packets, and forwards packets intended for the local network to the edge switch 194. Other packets are discarded or routed to another component.

The edge switch 194 forwards the packets receive from the CMTS 199 to the QAM modulator 189, which transmits the packets on one or more physical (QAM-modulated RF) channels to the CPE. The IP packets are typically transmitted on RF channels that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

"Packetized" Networks—

Figure 1D:
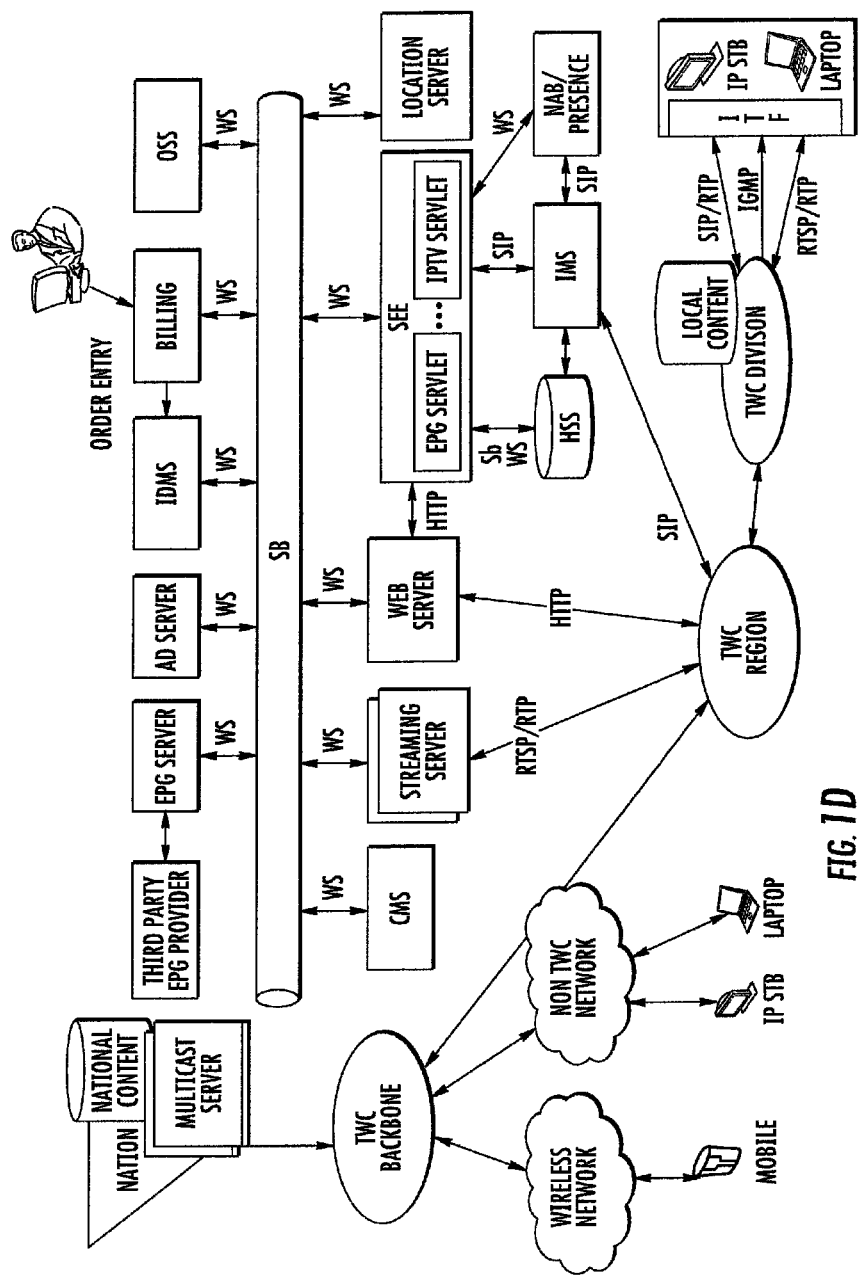
FIG. 1d is a functional block diagram illustrating one exemplary packetized content delivery network architecture useful with the present invention.

While the foregoing network architectures described herein can (and in fact do) carry packetized content (e.g., IP over MPEG for high-speed data or Internet TV, MPEG2 packet content over QAM for MPTS, etc.), they are often not optimized for such delivery. Hence, in accordance with another embodiment of the present invention, a "packet optimized" delivery network is used for carriage of the packet content (e.g., IPTV content). FIG. 1d illustrates one exemplary implementation of such a network, in the context of a 3GPP IMS (IP Multimedia Subsystem) network with common control plane and service delivery platform (SDP), as described in co-owned U.S. Provisional Patent Application Ser. No. 61/256,903 entitled "METHODS AND APPARATUS FOR PACKETIZED CONTENT DELIVERY OVER A CONTENT DELIVERY NETWORK, now co-owned and co-pending U.S. patent application Ser. No. 12/764,746 of the same title and published as U.S. Patent Application Publication No. 2001/0103374, each of which is incorporated herein by reference in its entirety. Such a network provides significant enhancements in terms of common control of different services, implementation and management of content delivery sessions according to unicast or multicast models, etc.; however, it is appreciated that the various features of the present invention are in no way limited to any of the foregoing architectures.

Premises Networking Architecture—

Figure 2:
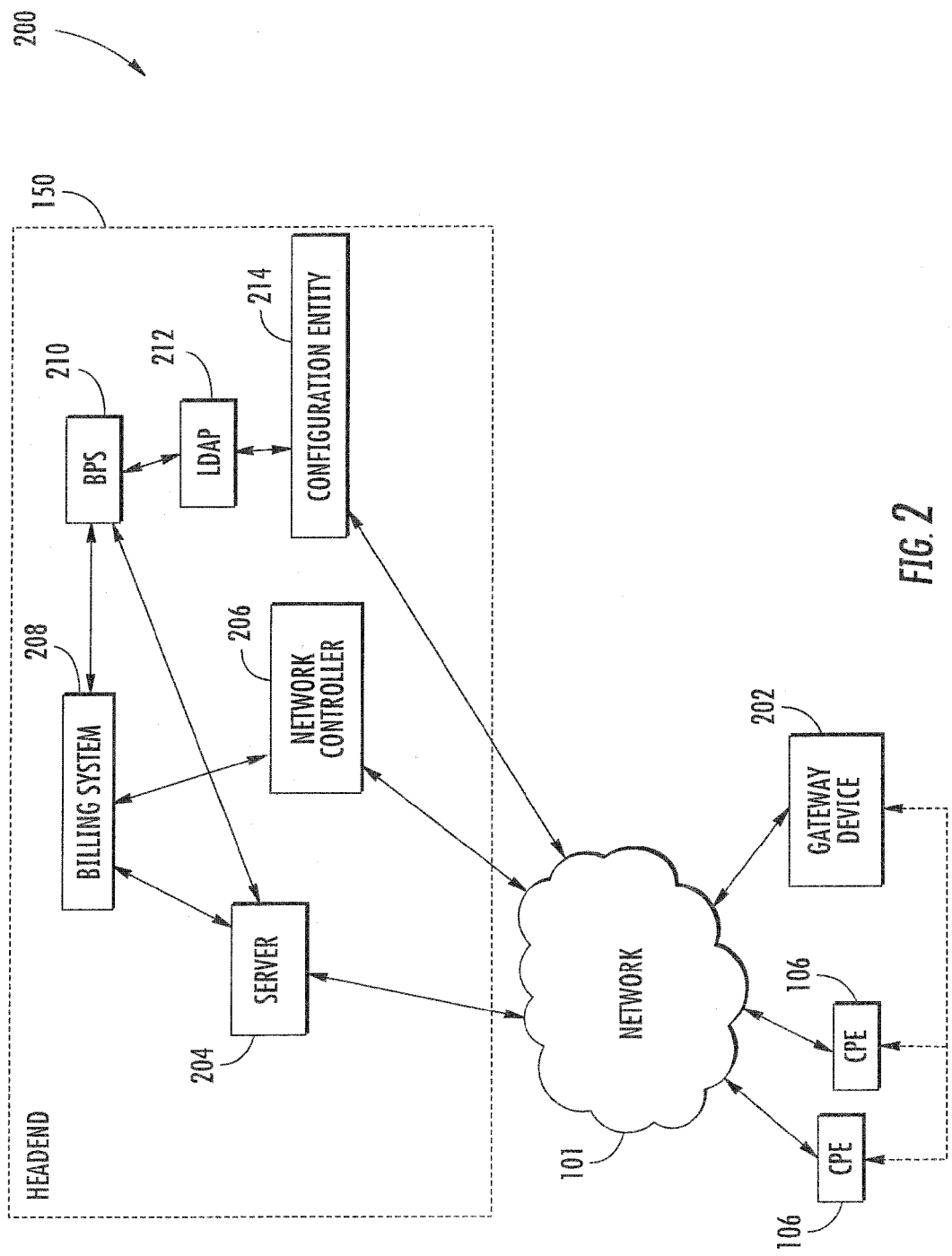
FIG. 2 is a functional block diagram illustrating one embodiment of a network architecture for providing protected premises networking according to the invention.

Referring now to FIG. 2, one embodiment of a network topology 200 for providing protected premises networking according to the present invention is illustrated. As shown, the cable headend 150 communicates with client devices or consumer premises equipment (CPE) 106 via a delivery (e.g., HFC) network 101. A gateway device 202 (e.g., a converged premises device or other multi-function unit of the type described subsequently herein) located at a consumer premises may also be used to communicate with the headend 150 via the network 101.

The cable headend 150 (see also FIG. 1*a*) communicates with the CPE 106 and gateway device 202 via an intermediary HFC network 101 (and a hub). The "last mile" connection to the customer's premises is typically via coaxial cable, but in some instances, fiber optic cable replaces coaxial cable as in a fiber-to-the-home (FTTH) implementation. So-called "fiber-to-the-curb" or FTTC optical implementations may also be used.

The terminating coaxial cable is routed into the customer premises, and is connected to one or more CPE 106 and/or one or more gateway devices 202. Typically, program channel content is transmitted downstream from the cable headend 150 or a BSA switching node over in-band frequencies, and internet (e.g., Internet) content is transmitted from the cable modem termination system (CMTS) over DOCSIS frequencies.

As illustrated in FIG. 2, the CPE 106 and gateway device 202 of the illustrated embodiment communicate with one another via Multimedia over Coaxial Alliance (MoCA)™ network communications (see e.g., MoCA Specifications v10, February 2006; MoCA. Specifications v1.1 Extensions, May 2007; and IEEE Std. 802.1 AVB WG Specifications, each of which is incorporated by reference herein in its entirety). Such communication is facilitated via the provision of a password or key which is unique to a particular premises. In one embodiment, the password is delivered to the CPE 106 and gateway device 202 independently via two independent provisioning structures utilizing various entities of the network headend 150. The password or key may comprise for example a universal user identification (QUID) generated by the exemplary algorithms disclosed in the previously referenced MoCA version 1.1 specification. Once the password or key is received at the gateway device 202 and CPE 106, the devices may communicate over the MoCA network. If the password/key is updated or changed, the CPE 106 and gateway device 202 each receive the update/change, and remain synchronized.

As will be discussed in greater detail below, the CPE 106 may include any number of client devices, whether alone or in combination. For example, the CPE 106 may include one or more content rendering devices (e.g., displays), content generating devices, set-top boxes, digital video recorders (DVR), personal media devices (PMD), cellular telephones, etc. well known in the electronic arts. Also discussed below, the gateway device 202 is in the illustrated embodiment a device which is adapted to, inter alia, receive signals from the HFC network and pass these on to other devices in the network (including in one variant, one or more of the aforementioned CPE 106). The gateway may also be equipped to receive content or signals via other interfaces (e.g., from a WiMAX or Wi-Fi network, other broadband connection, etc.) and pass these on to other devices at the premises.

As illustrated in FIG. 2, numerous entities are located at the cable network headend 150 of the exemplary network architecture 200. For example, an application server 204, a network controller 206, a billing system 208, a broadband provisioning system (BPS) 210, a Lightweight Directory Access Protocol (LDAP) 212, and a configuration entity 214 may be present. As will be discussed in greater detail below, these headend entities work individually or in concert to provide the CPE 106 and the gateway device 202 with information necessary to establish a MoCA network therebetween (e.g., a password or key).

The server 204 is a headend entity adapted to obtain a password on behalf of the CPE 106. As noted previously, a password is needed by the devices to enable premises network communications. In one embodiment, one or more of the CPE 106 sends a request for a MoCA password to the server 204, which then uses information about the requesting device to link the device to a user account. The information about the requesting device includes in one embodiment a Media Access Control (MAC) address. Other types of device information may be used, such as a TUNER_ID or the like. The server 204 communicates with the billing system 208 via a common billing interface (CBI), which is also used for communication between the BPS 210 and billing system 208 (as discussed elsewhere herein).

The server 204 uses the device information to request or access account information from the billing system 208. Once a user account is determined, the server 204 uses the account number (or other identifier of the user account, which may be cryptographically hashed if desired for anonymity) to retrieve the password (e.g., UUID) from the BPS 210. A web services interface is used, in one embodiment, to communicate between the server 204 and the BPS 210. Although other interfaces may be used, it will be appreciated that the web services interface discussed herein enables various devices to be networked together from different geographic locations. If no UUID for the given account number exists, in one embodiment, the server 204 will periodically check back for updates until the requested UUID has been placed in the LDAP 212 and made accessible to the BPS 210. In another embodiment, the server 204 may generate a UUID for the device. Alternatively, the UUID may be generated by the BPS 210.

The UUID may be generated according to the methods disclosed in the previously referenced MoCA 1.1 specification. For example, the UUID may be produced via a random number generator or a number sequence where the next number in the sequence would be assigned to an incoming request for a MoCA password for an account that has not already been assigned one. Other methods for producing the UUID may also be used consistent with the present invention.

If the UUID is generated at the BPS 210, it is subsequently transmitted to the server 204 via the web services interface. The server 204 may be further configured to transmit the retrieved or derived UUID to the CPE 106. As will be discussed below with respect to FIG. 2*a*, the server 204 may be farther adapted to perform additional useful functions.

Referring back again to the architecture 200 of FIG. 2, the network controller 206 is shown. The network controller 206 in this embodiment is a network controller which associates data elements. For example, the network controller 206 may provide channel mapping information, PID (program ID) tuning information, and tuning event information. The network controller may be comprise for example the digital network controller system (DNCS) manufactured by Cisco/SA DBDS; in another example, the Motorola DAC network controller product may be utilized. The network controller 206 may also be configured to use a CPE 106 MAC address or other identifying information to correlate the CPE 106 to its configuration information, service/subscription information, etc. When changes are made to a user's account at the billing system 208, these changes are updated at the network controller 206, and reported to the CPE 106. For example, if the user adds home network service to his subscriber account, the records relating to the user's CPE 106 associated with the account is updated by the network controller

206. The network controller 206 then contacts the appropriate CPE 106, and indicates to these devices that a password is needed to establish a connection to the home service network. The network controller 206 sends an entitlement for the home networking service to CPE 106. An application running on the CPE 106 (such as e.g., a digital navigator application), upon receiving the entitlement message determines that the CPE 106 must contact the server 204 (or another entity, such as a proxy not shown) in order to obtain the password.

The network controller 206 and server 204 are communicatively coupled (e.g., via LAN or other interface) to the headend billing system 208. The billing system 208 maintains records regarding subscriber accounts and devices as is well known in to those of ordinary skill in the art, and thus will not be discussed in further detail herein. The billing system 208 is further in communication with the broadband provisioning system (BPS) 210 which communicates with a Lightweight Directory Access Protocol (LDAP) 212 and configuration entity 214. The configuration entity 214 also communicates directly with the premises gateway device 202 via the network 101. Accordingly, the gateway device 202 is instructed to contact the configuration entity 214 via the BPS 210 using an SNMP for a configuration profile. The SNMP sent to the gateway device 202 indicates to the device that there is an updated configuration profile available. In other words, when there is a change to the password, the changed information is placed into the LDAP 212 via the BPS 210. The BPS 210 communicates to the server 204 that there is an update, and this message is communicated to the CPE 106. A separate SNMP message is sent from the BPS 210 to the gateway device 202 indicating that the configuration has changed and that the gateway device 202 must reestablish connection to the configuration entity 214 to pull configuration information again.

As noted above, the BPS 210 maintains a database of passwords (UUID) and their corresponding subscriber account (e.g., account numbers or other unique identifying information). In one embodiment, each CPE 106 associated with an account number is listed by MAC address and cross-referenced to a UUID. The UUID may be unique to a particular subscriber or account (with each device in the network having the same password), or may be unique to each device (and the network approved devices being listed at a network entity). The latter embodiment utilizing methods and apparatus disclosed in co-owned and co-pending U.S. application Ser. No. 12/611,006 filed contemporaneously herewith and entitled "Apparatus and Methods for Device Authorization in a Premises Network", previously incorporated herein in its entirety. As noted previously, the server 204 may request UUID records from the BPS 210 such as by providing a MAC address. The BPS 210 uses the MAC address to determine whether a UUID exists and if so, provides the UUID to the server 204.

The BPS 210 may also provide the UUID to the LDAP 212. In one embodiment, the BPS 210 transmits UUID as they are created (at the BPS 210) or received from either the billing system 208 or server 204. Thus, when a gateway device 202 requests a configuration file, the configuration entity 214 looks into the LDAP 212 for the password and, if one is found, it is place in the configuration file sent to the gateway device 202. In most instances, the password will be in the LDAP 212 prior to the aforementioned request, as the password is created as soon as the account is given appropriate authority to include networking capabilities. However, if the password is not located the XML configuration file sent to the gateway device 202 will be empty. The device 202, in one embodiment, upon receiving the empty file, will re-request the configuration file until the password is placed therein (e.g., will continue requesting until the password is generated and populated to the LDAP 212).

The configuration entity 214 is in direct communication with both the LDAP 212 and the gateway device 202. The configuration entity receives UUID from the LDAP database 212 by request, such as via a request from the gateway device 202. Alternatively, as new UUIDs are received by the LDAP 212, they are automatically transmitted to the configuration entity. In one embodiment, only the UUIDs associated with the gateway device(s) 202 are transmitted to the configuration entity 214. In other words, the configuration entity 214 may only maintain UUID records for gateway devices 202, and not for any of the premises CPE 106.

In another implementation (not shown), content and/or data may be distributed to or from a CPE 106 or gateway device 202 (or a cable modem associated with either the CPE 106 or gateway device 202) via Worldwide Interoperability for Microwave Access (WiMAX) transport; see IEEE Std. 802.16e-2005 entitled "IEEE Standard for Local and metropolitan area networks—Part 16: Air Interface for Fixed and Mobile-Broadband Wireless Access Systems Amendment 2: Physical and Medium Access Control Layers for Combined Fixed and Mobile Operation in Licensed Bands" which is incorporated herein by reference in its entirety). For example, multiple WiMAX base stations may be established by the MSO or other content provider. One or more of the WiMAX stations transmit programming or other content and/or data to the CPE 106 (which may include simultaneous transmission or retransmission for error correction purposes, so as to ensure a robust signal is received and to potentially support any QoS requirements). In one embodiment, a CPE 106 or gateway device 202 having an associated cable modem may transmit and receive out-of-band data via WiMAX transport. In yet another embodiment, in-band content and/or data may also be sent/delivered using the aforementioned WiMAX transport. In this fashion, the WiMAX transport acts as a wireless data "pipe" in parallel to the normal DOCSIS or in-band RF channels (e.g., QAMs) transmitted over the cable or satellite distribution network.

It will also be recognized that the device identifying information sent to the network from the premises may be cryptographically hashed using e.g., a one-way hash algorithm of the type well known in the cryptographic arts on the MAC address, TUNER_ID, etc. See, e.g., co-owned and co-pending U.S. patent application Ser. No. 11/186,452 filed on Jul. 20, 2005 and entitled "METHOD AND APPARATUS FOR BOUNDARY-BASED NETWORK OPERATION", incorporated herein by reference in its entirety. This advantageously produces unique identifying information for the device being added to the network, yet which is anonymous. For instance, in one variant of the invention, the MAC address is hashed to form a cryptographic output or residue, which is sent to the head-end as part of the aforementioned request. The head-end process (e.g., billing system 208, server 204, BPS 210, etc. depending on how configured) then searches the subscriber accounts or data base for a matching hash (which may have been generated already and stored, or alternatively which may be generated "on the fly", using knowledge of the hashing algorithm used by the premises device). When a matching hash is found, that account is evaluated for various attributes as needed (e.g., subscription level, payment status, etc.), and depending on this information, a password is located/generated and sent. In its most basic form, the network does not even need to determine which particular account the matching hash is associated with, but rather that the hash is in the user or subscriber database somewhere, and associated with a viable account.

Figure 2A:
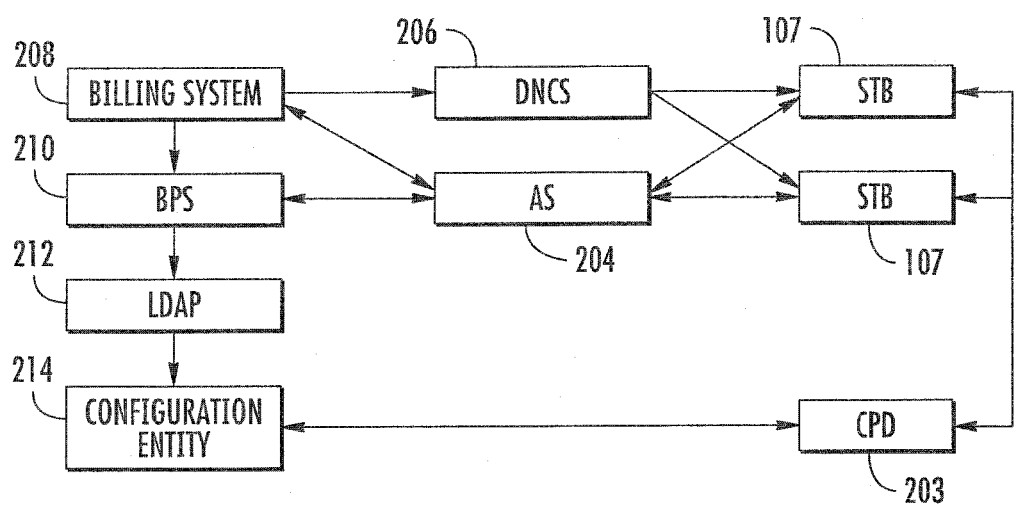
FIG. 2a is a functional block diagram illustrating a second embodiment of a network architecture for providing protected premises networking according to the invention.

FIG. 2a illustrates another embodiment of a network architecture for providing a protected premises network according to the invention. In the illustrated embodiment, the CPE 106 may comprise one or more set-top boxes (STB) 107 and the gateway device 202 comprises a converged premises device (CPD) 203. An exemplary CPD 203 is discussed in co-owned, co-pending U.S. patent application Ser. No. 11/378,129 filed Mar. 16, 2006 and entitled "Methods and Apparatus for Centralized Content and Data Delivery", published as U.S. Patent Publication No. 2007/0217436, and issued as U.S. Pat. No. 8,347,341 on Jan. 1, 2013, which is incorporated herein by reference in its entirety. As discussed therein, in one embodiment, the exemplary CPD 203 comprises a remotely manageable premises device that, inter alia, acts as a centralized client networking platform, providing gateway services such as network management as well as traditional content and high-speed data delivery functions. The device also acts as the shared interact connection for all devices in the premises via a cable modem or other such interface, sharing personal and DVR content such as video, music and photos (and any associated metadata) throughout the premises, and providing both a wired and wireless network in the home. Telephony services utilizing e.g., embedded multimedia terminal adapter (eMTA) and/or Wi-Fi architectures may also be provided via the CPD 203; these services can make use of the network operator's indigenous VoIP or comparable telephony capability if desired, thereby providing an even more unified service environment for the subscriber.

For example, in one particular implementation, the CPD or gateway device 203 is configured with a Texas Instruments DSP-based Puma-4 VoCable chipset (TNETC4700) that provides support for cellular codecs, low bit-rate codecs and advanced fax capabilities, although it will be recognized that any number of other devices and/or architectures may be used consistent with the invention to provide such functionality. The CPD 203 can also provide a trusted domain for content or data, as well as allowing a subscriber total mobility in the home. The exemplary CPD 203 is also advantageously accessible via any remote device with internetworking (e.g., Internet) capability, thereby allowing personal content to be accessed by the user (or other entities) from outside the premises.

In the embodiment illustrated in FIG. 2a, the server 204 comprises an application server (AS) such as that discussed in co-owned U.S. patent application Ser. No. 10/263,015 filed Oct. 2, 2002 and entitled "Network based digital information and entertainment storage and delivery system", now published as U.S. Patent Application Publication No. 2003/0208767, and issued as U.S. Pat. No. 7,908,626 on Mar. 15, 2011, which claims priority under 35 U.S.C. 119(e) the benefit of U.S. Provisional Application No. 60/377,963 filed on May 3, 2002, each of the foregoing incorporated herein by reference in its entirety. In one variant, the AS 204 is a Mystro™ server device of the type utilized by the Assignee hereof, although it will be appreciated that other configurations may be utilized with equal success. According to this embodiment, the STB 107 may communicate with the AS 204 to receive password (UUID). The AS 204 according to this embodiment may be configured to deliver password to the STB 107 as well as to generate device or subscriber specific passwords. Exemplary algorithms for generating passwords are given in the MoCA version 1.1 specification, which is previously referenced and incorporated herein by reference in its entirety, although others may be used as well. The AS 204 may be further adapted to perform content processing functions such as e.g., reformatting program streams (transcoding, transrating, etc.), and implementing trick mode functionality.

It should be noted that the above-described embodiments of the premises network topology shown in FIGS. 2-2b are merely exemplary of the broader principles of the invention; many other network configurations and possible topologies can be utilized.

Methodology—

Currently, devices seeking to gain access to a premises network do so by utilizing a password. For example, the default on all MoCA devices is to disable encryption and not use a password. However, the present invention provides secure content transport over a network by turning on MoCA encryption between managed devices.

Figure 3A:
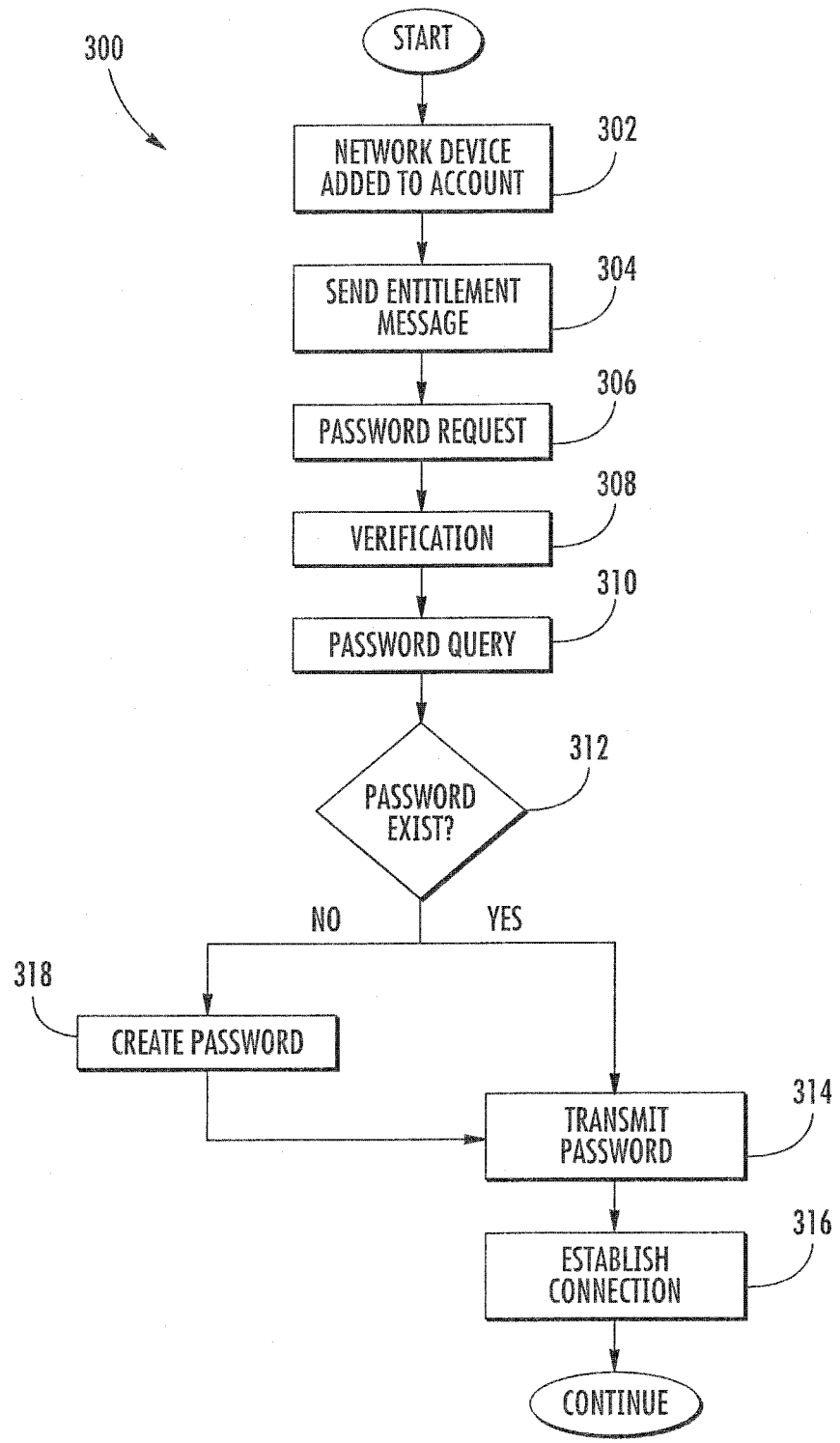
FIG. 3a is a logical flow diagram illustrating one embodiment of the method for providing protected networking capabilities to premises devices according to the invention.

Referring now to FIG. 3a, one embodiment of the method 300 for providing a protected premises network password to one or more CPE 106 and/or STBs 107 in premises network is given. As discussed previously, a premises network such as a MoCA-enabled network is established by bridging the provisioning infrastructure for the "data" side component (gateway device 202 or CPD 203) and the "audio/video" side component (CPE 106 or STB 107) via a common password (e.g., UUID).

Per step 302 of the method 300, a network capable device 106, 107 is added to a user's account. In one embodiment, the device 106, 107 may be added by entering a MAC address for the device 106, 107 which is then correlated to a user or subscriber account number. Alternative mechanisms for linking the device 106, 107 to the user or subscriber are also herein recognized. Correlation of one or more devices 106, 107 to respective ones of multiple subscriber accounts may be affected by a database or storage entity at the billing system 208, BPS 210 and/or server 204 (or AS 204).

In one embodiment, the device 106, 107 identifier (e.g., MAC address) is manually entered by a technician or other MSO personnel. For example, the user may, via telephone, email, text message, etc. give an operator a MAC address to be added to his/her account. Alternatively, a technician may connect the device 106, 107 to the user's premises and facilitate its addition to the user's account (e.g., via a service call). In another embodiment, when a user plugs a network device 106, 107 into an existing home or premises network, a series of communications may occur between the added device 106, 107 and one or more headend 150 entities resulting in the addition of the network device 106, 107 to the user's account without requiring a substantial user, operator and/or technician action or intervention.

Each of the devices added to the premises network (step 302) is given a network address. In one embodiment, the premises network address assigned to the devices is generated using network address translation (NAT) techniques. For example, information in datagram packet headers of the various devices on a premises network may be modified in order to "hide" the private addresses behind a single, public IP address.

In yet another embodiment, the methods and apparatus discussed in co-owned, U.S. patent application Ser. No. 12/611,006 filed contemporaneously herewith and entitled "Apparatus and Methods for Device Authorization in a Premises Network", and issued as U.S. Pat. No. 8,745,758 on Jun. 3, 2014, which is incorporated herein by reference in its entirety, may be implemented to detect and facilitate the joining of a device (either CPE 106 or gateway device 202) to a premises network. For example, the methods and apparatus discussed therein may be utilized to authorize a particular CPE 106 to receive content and/or data from (i.e., join) a particular premises network such as by adding the device to a "white list" associated with the premises.

When a new device 106, 107 is added to a user's account, the network controller 206 is notified by the billing system 208. In response, the network controller 206 transmits an entitlements message to the new device 106, 107 (step 304). The entitlement message informs the device 106, 107 that it is entitled to home network services (which may include descriptive information or metadata regarding the types of services, rules for their use, limitations or restrictions, optimization information, etc.), and that in order to begin premises network communications it must obtain a password from the server 204, 205.

In response to the entitlement message, at step 306, the device 106, 107 sends a password request message to the server 204. The password request contains information regarding the device 106, 107. For example, the request may contain the MAC address (e.g., MAC-48, EUI-48, or EUI-64 format) of the device 106, 107. Other information (such as a device type or descriptor, manufacturer code, etc.) may be included as well. This request may be sent "in the clear", or alternatively encrypted or otherwise protected against malicious interception or attacks (such as via use of a cryptographic hash for integrity protection/detection). The password request also contains the premises network service request type.

Per step 308, the device 106, 107 is verified. Verification of the device 106, 107 may include correlating the device 106, 107 to a user account. In one embodiment, the server 204, transmits the device identifying information (e.g., MAC address or CBI) to the billing system 208 in order to obtain an account number associated with the premises to which the device 106, 107 is being added. Once the device is verified (i.e., determined to be on a valid subscriber account record), and account number associated with the device is obtained, the account number or other reference is used to query the BPS 210 for a password (step 310).

The aforementioned verification of the device may also involve other types of operations or checks. For instance, the MAC address provided may be checked against a database of known manufacturer and/or device type codes (i.e., the MAC address may encode the manufacturer's registered identification number, and/or MAC address ranges may be allocated based on manufacturer and/or device type). Hence, sometimes a fake or bogus device can be detected when the MAC address does not correlate with the manufacturer and/or device type information that in the MSO's database (or that of a third party accessible to the MSO).

At step 312, the BPS 210 determines whether a password exists for the account number/reference provided. If a password exists, per step 314, it is transmitted back to the device 106, 107 via the server 204. As with the request, this data may be encrypted, integrity-protected, or otherwise secured if desired. Upon receipt (and decryption as applicable), the device 106, 107 may then communicate within the premises network using the password (step 316).

However, if at step 312, the BPS 210 determines that a password for the device does not exist, then, a password is created (step 318). In one embodiment, the password is created by the server 204, and is specific to some attribute of the user's account or subscription. For instance, the password can be made specific to a user premises such as by being linked to or derived from a user IP address or other account-specific information.

The newly created password is then transmitted to the device 106, 107 as above, as well as to the BPS 210, so that a password entry may be created for future reference (step 314). Then, per step 316, the device 106, 107 may communicate within the premises network. Communication within the network may include content and data sharing between the gateway 202 or CPD 203, and the CPE 106 or STB 107, including any other components associated with either. For instance, a media bridging apparatus that acts as a connection between a portable media device (PMD) and a user's home network may be used. See, e.g., co-owned and co-pending U.S. patent application Ser. No. 12/480,597 filed on Jun. 8, 2009 and entitled "MEDIA BRIDGE APPARATUS AND METHODS", which is incorporated herein by reference in its entirety. This bridging apparatus may be used, for example, to convert content stored on the PMD to a format capable of being presented on a user's set-top box or other client device. Control of the presentation is also provided by the bridging apparatus. In one embodiment, the apparatus enables a user to access and control playback of media from a PMD via a user interface associated with a television, personal computer or other user device. The apparatus may also enable content stored on the PMD to be copied and stored on a user's digital video recorder (DVR) or other storage apparatus, optionally while maintaining appropriate copyright and digital rights management (DRM) requirements associated with the content being manipulated.

The media bridging apparatus can also work within a premises network or trusted domain for media content, thereby allowing a subscriber total mobility in the premises network. For example, media content from the PMD may be accessed via extant networks for distribution to any STB, PC, mobile device, or other PMD.

The media bridging device may also utilize the existing premises network (including a network defined by coaxial cable in the premises, such as a MoCA-enabled network) to allow devices and DVRs to share media content with the PMD.

Figure 3B:
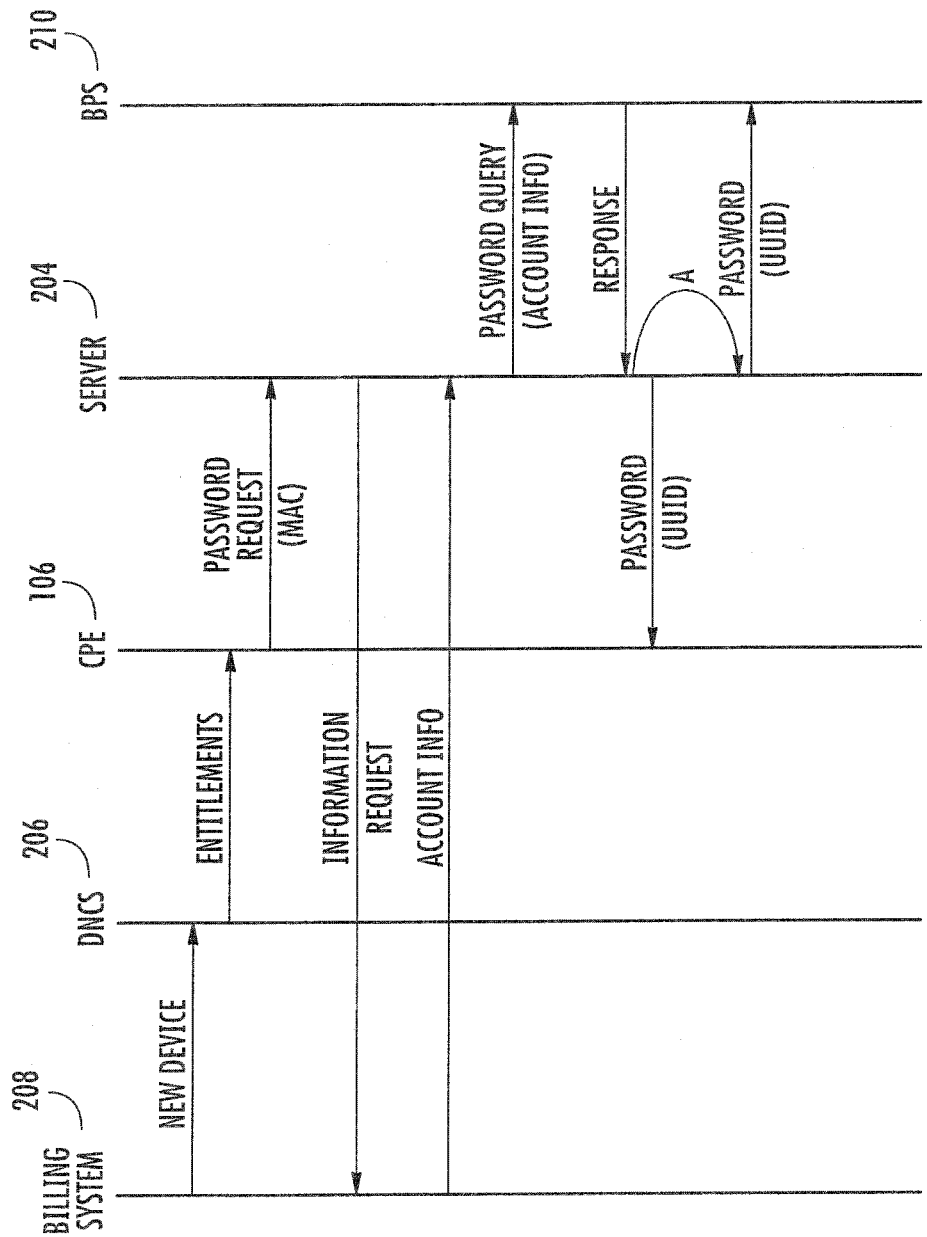

FIG. 3b illustrates an exemplary communication sequence used when implementing the method 300 of FIG. 3a. As shown, when a new device enters the network (such "entry" which may be according to any number of mechanisms such as manual entry of data, automatic configuration, etc. as described previously herein), a new device message is transmitted from the billing system 208 to the network controller 206. The network controller 206 then forwards an entitlements message to the CPE 106. The entitlements message triggers the CPE 106 to request a password from the server 204 (whether immediately or with a delay, such as where the entitlements message enables the request to be issued upon occurrence of another event, such as the CPE being powered up, achieving a certain operational or software state, receiving a certain command from a premises user, etc.).

The server 204 uses information in the password request to request account information from the billing system 208. The account information is then transmitted from the server to the BPS 210 within the body of a password query. The BPS 210 determines whether a password exists, and responds to the server 204 query. The response may include the password or other security feature(s) associated with the CPE 106, or may indicate that the server 104 must create a new password. The password is then forwarded to the CPE 106. If a new password was created, it is also forwarded to the BPS 210 per pathway A.

Figure 4A:
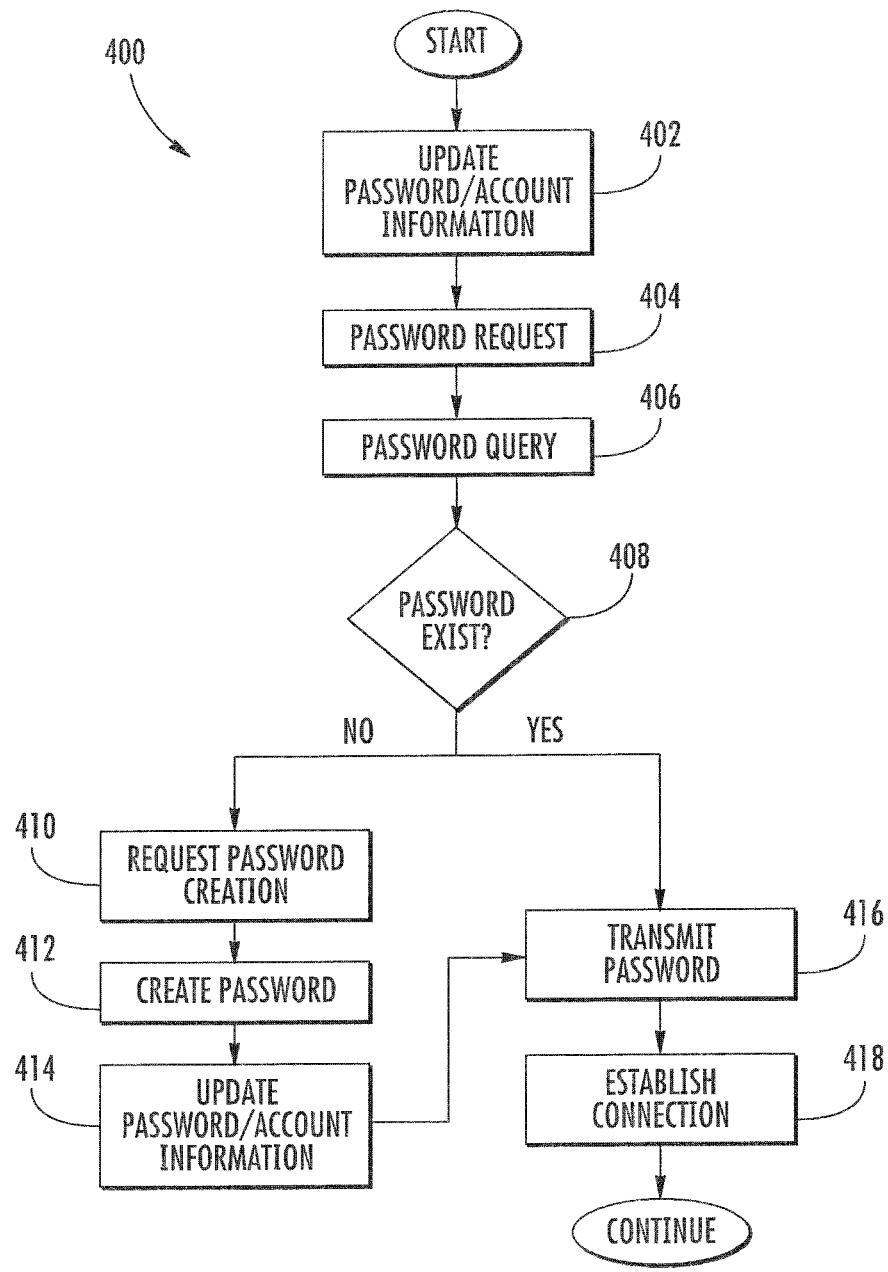
FIG. 4a is a logical flow diagram illustrating one embodiment of the method for providing protected networking capabilities to a gateway device according to the present invention.

Referring now to FIG. 4a, one embodiment of the method 400 for providing a protected premises network password to one or more gateway devices 202 and/or CPD 203 in the premises network is given. As above, the protected password enables a premises network to be established by bridging the provisioning infrastructure for the data side component (gateway device 202 or CPD 203) and the video side component (CPE 106 or STB 107).

As new devices are added to a home network, passwords are created and associated with a subscriber account. Per step 402, password and subscriber account information is updated. In one embodiment, updating includes sending the information to the LDAP database 212 for storage thereon. In another embodiment, the configuration entity 214 is updated by receiving passwords stored at the BPS 210 and transmitted thereto via the LDAP 212. The configuration entity 214 creates XML files from values in the LDAP database 212 and sends the XML files to SMB/gateway.

Next per step 404, the gateway device 202 or CPD 203 receives the SNMP message from the BPS 210 and in turn requests a password from the configuration entity 214. The gateway device 202 may present a digital certificate to the configuration entity 214 prior to or concurrent with the password request for verification purposes. Alternatively transport layer security (TLS) or security sockets layer (SSL) cryptographic protocol may be utilized. Password request in one embodiment contains identifying information about the requesting device 202, 203. For example, the request may comprise a MAC or other address for the device 202, 203, as well as other identifying information (e.g., device type, capabilities profile, configuration data (e.g., software versions installed, etc.). In response to the request, at step 406, the configuration entity 214 queries a database associated therewith for the password associated with the requesting device 202, 203 (step 406). Alternatively, the configuration entity 214 may forward the request to the LDAP database 212 for a query thereof (step 406).

If a password exists (step 408), the password is transmitted to the requesting device 202, 203 (step 416) and a premises network connection is established (step 418). If a password does not exist (step 408), the configuration entity 214 requests creation of a password at step 410. The configuration entity 214 sends the creation request message to the BPS 210; the creation request message contains at least information identifying the gateway device or CPD 202, 203 (e.g., MAC address). The BPS 210 forwards the creation request message to the server 204. In response, the server 204 verifies the gateway device 202, 203 via the billing system 208. Verification of the MAC address of the gateway device or CPD 202, 203 results in the billing system 208 returning an account number (or other subscriber account identification information) to the server 204 which is used, in one embodiment, by the server 204 to create a password (step 412).

At step 414, the newly created password is then transmitted to the configuration entity 214 for updating the configuration files thereof or alternatively to the LDAP database 212 for updating, and then forwarded on to the configuration entity 214. Once the password is created and updated, it is transmitted to the gateway device or CPD 202, 203 (step 416) which enables network communication (step 418). The gateway device may then operate as a proxy for all data and content signals from the cable network 101, and from the premises (e.g., MoCA) network.

Figure 4B:
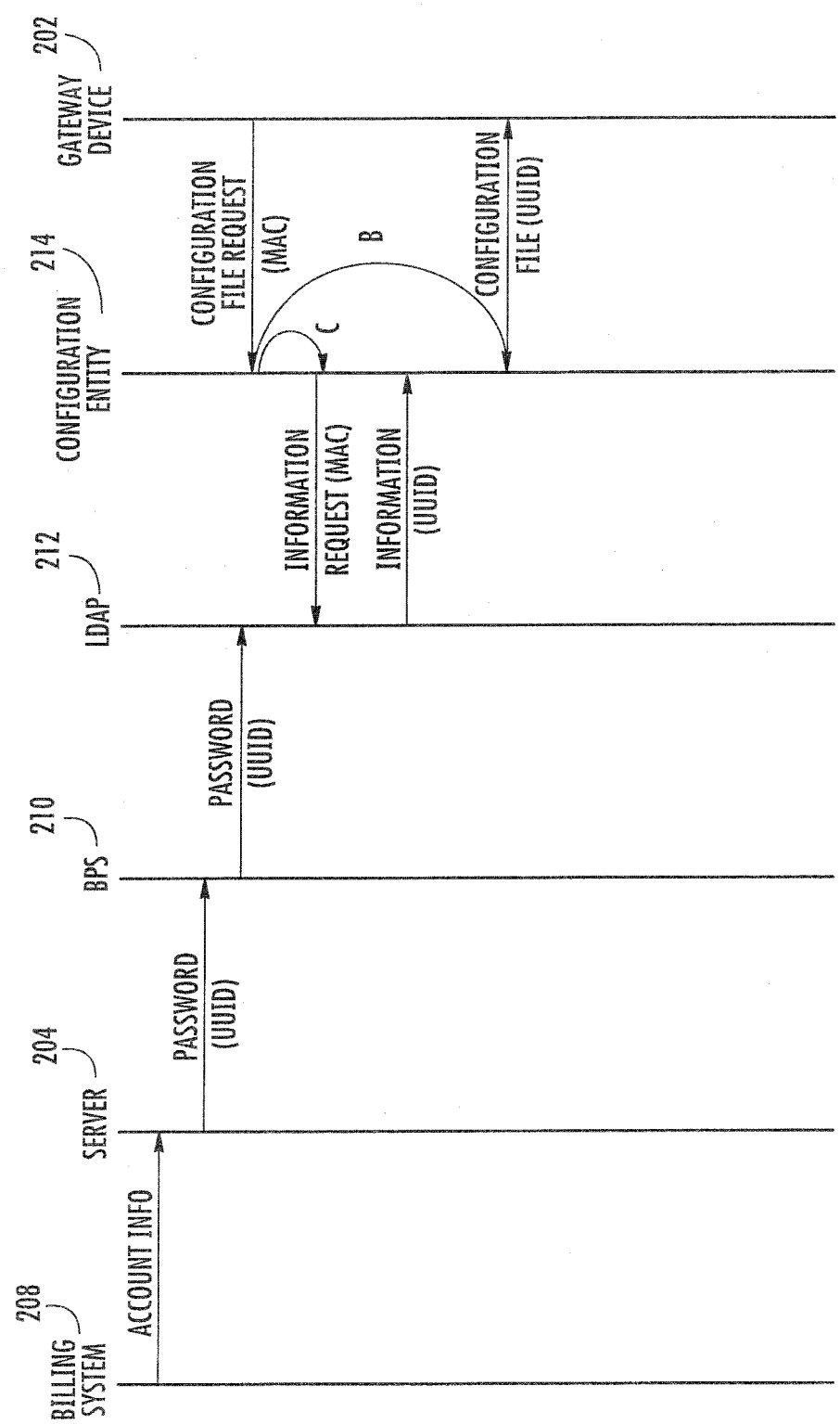

FIG. 4b illustrates an exemplary communication sequence for the method 400 of FIG. 4a. As shown, a gateway device 202 requests a configuration file from the configuration entity 214. If the configuration entity's 214 updated files indicate a password for the device, it is transmitted thereto via pathway B in the configuration file. Alternatively, the configuration entity 214 use information in the request to retrieve specific information from the LDAP database 212 (pathway C) which is inserted into the configuration file.

However, if there is no password held in a database associated with the configuration entity 214 and/or the LDAP database 212, in one embodiment, a creation request is forwarded to the server 204 (via the BPS 210 and in some cases the LDAP 212). In order to create the password, the server 204 verifies the MAC address of the requesting device with the billing system 208 in order to obtain account information. The account information is used by the server 204 to create a password which is forwarded to the gateway device 202. Alternatively, the device may simply be required to check back with the configuration entity 214 when it receives an empty configuration file.

Server—

Figure 5:
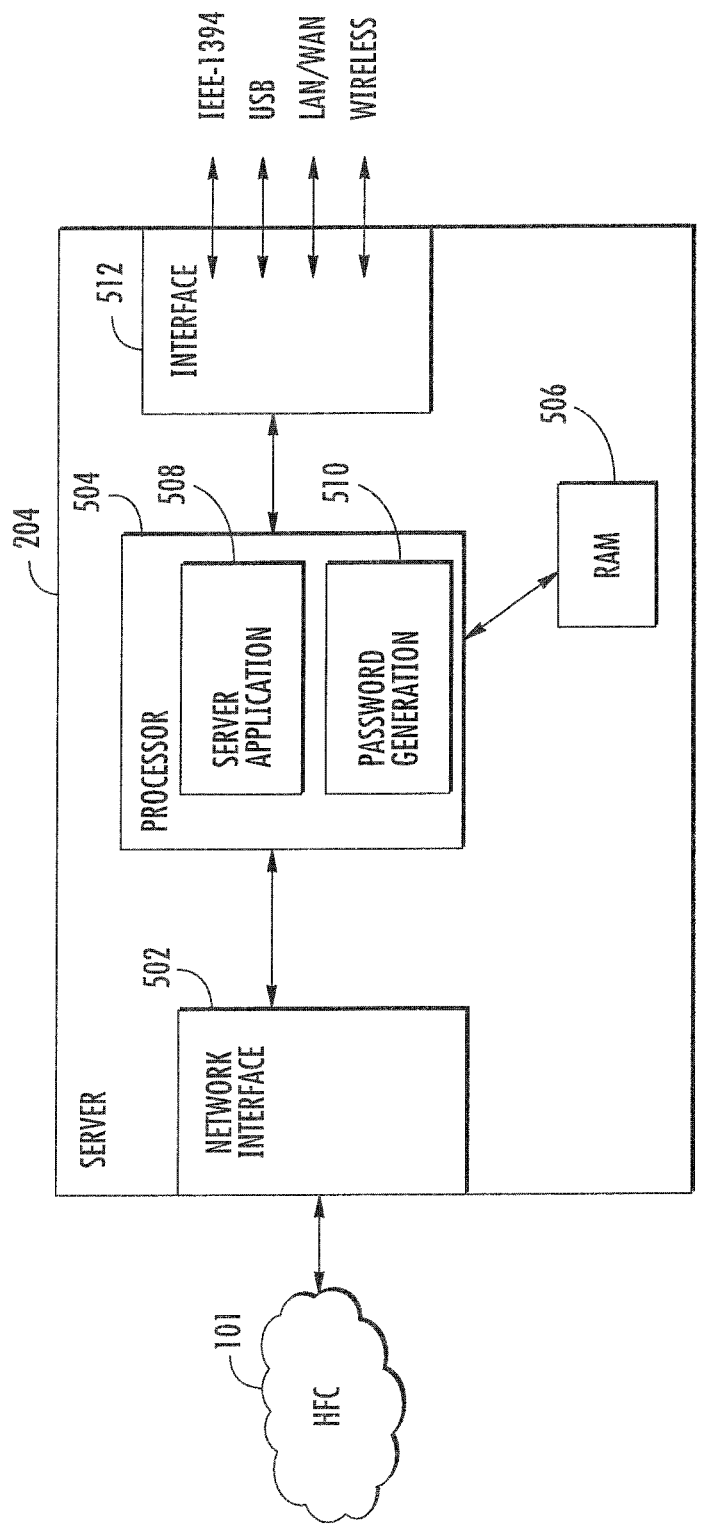
FIG. 5 is a block diagram of one embodiment of a server for use within the present invention.

Referring now to FIG. 5, an exemplary configuration server device 204 is described in detail. In the illustrated embodiment, the server 204 is disposed at the headend 150 and generally comprises a network interface 502 for communication with the HFC network 101, a processor subsystem 504 and associated RAM 506, as well as additional interfaces 512 for communication with other headend 150 entities.

The processor subsystem 504 is configured to run both a server application 508 and a password generation 510 application thereon. The server application 508, when executed, enables the server 204 to receive password requests, and extracts information from the password request (such as MAC address, etc. of the requesting device) to verify the requesting device at a billing entity. The server application 508 uses information received from a verification message regarding the subscriber account linked to the device (such as account number) to then request a password from a storage entity, which it then returns to the requesting device.

In the event a password for the subscriber account associated with a device has not yet been created, the password generation application 510 uses information about the device (e.g., MAC address) and/or about the subscriber account associated with the device (e.g., account number) as seed information in algorithms utilized in the creation of a password. The hash output generated by the algorithms is such that the user-specific information cannot be deduced or derived therefrom. In one embodiment, the password generation application 510 uses the algorithms disclosed in the previously referenced the MoCA version 1.1 specification (previously incorporated herein by reference) to create a password. Alternatively, the passwords may simply be generated without use of the aforementioned device or user-specific "seed information".

As noted previously, the server 204 may in one embodiment comprise an application server (AS) 204 such as discussed in previously incorporated co-owned, U.S. patent application Ser. No. 10/263,015.

It is appreciated that the server 204 may comprise additional components (not shown) and functionality well known to those of ordinary skill in the cable and embedded system fields, and accordingly not described further herein. For example, management or supervisory processes, and/or business rules software (described in greater detail below) may be run on the server 204. Fail-over protection, additional physical or network security mechanisms, etc. may also be used.

Configuration Entity—

Figure 6:
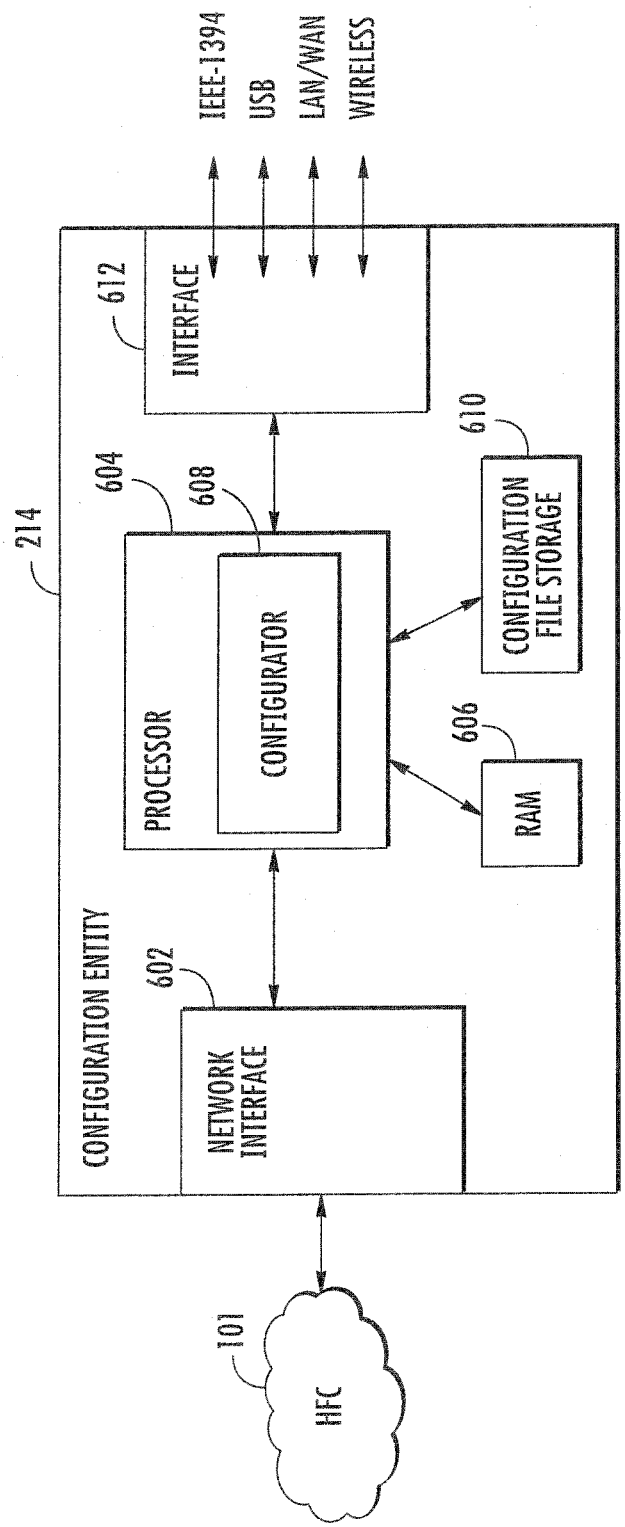
FIG. 6 is a block diagram of one embodiment of a configuration entity for use within the present invention.

FIG. 6 illustrates an exemplary embodiment of a configuration entity apparatus 214. As shown, the configuration entity 214 generally comprises a network interface 602 for communication with a network (such as HFC network 101). It is via the network interface 602 which devices at the subscriber premises, such as the gateway device 202 or CPD 203, may communicate with the configuration entity.

The configuration entity 214 further comprises a processor subsystem 604 and associated storage device 606. In the illustrated embodiment, the processor subsystem is adapted to run at least one computer program, the configurator 608, which in response to a password request, queries the configuration file storage entity 610 for a password associated with a gateway device 202. The configurator 608 utilizes a MAC address of the requesting device (and/or other identifying or characterizing information) to match to an entry in the configuration file database 610. The password or other relevant security feature is then transmitted back to the gateway device 202 via the network 101 (e.g., via in-band or OOB downstream channel), or alternatively via another transport such as a WiMAX broadband connection.

In another embodiment, during the registration process of the gateway device 202, the configurator 608 may receive a message from the BPS 210 via the back-end interface 612 of the configuration entity 214. The BPS 210 informs the configurator 608 that configuration file associated with the newly registered gateway device 202 should be automatically transmitted thereto.

Alternatively, a newly added gateway device 202 or CPD 203 may begin an embedded multimedia terminal adapter (eMTA) process. An eMTA combines delivery of HSD with VoIP services by connecting legacy phones and terminal equipment (i.e., POTS telephones and fax machines) to an MSO's IP network. The eMTA triggers the device 202, 203 to request the XML-based configuration file from the configuration entity 214, and the gateway/CPD process is begun. The configuration file may be unique to each individual device 202, 203 (based on subscriber-specific information) as opposed to a generic DOCSIS file handed to the device. Hence, each gateway device 202 or CPD may have a custom configuration file built for it.

As discussed above, in yet another alternate embodiment, the configurator 608 may, in response to a password request, query the LDAP database 212 for the configuration file having the password via the interface 612.

The configurator 608 running on the configuration entity 214 may be further adapted to store configuration files for backup and restoration in the event of a hardware failure at the gateway device 202 or CPD 203.

The configuration files may be updated periodically, upon configuration changes, or the occurrence of certain events, such as by sending only the changed section of the XML configuration file (thereby saving bandwidth and processing time), or alternatively replacing the entire file with an updated version. The data in the configuration files may also be aggregated (e.g., as part of a relational or other type of database).

Gateway Device—

Figure 7:
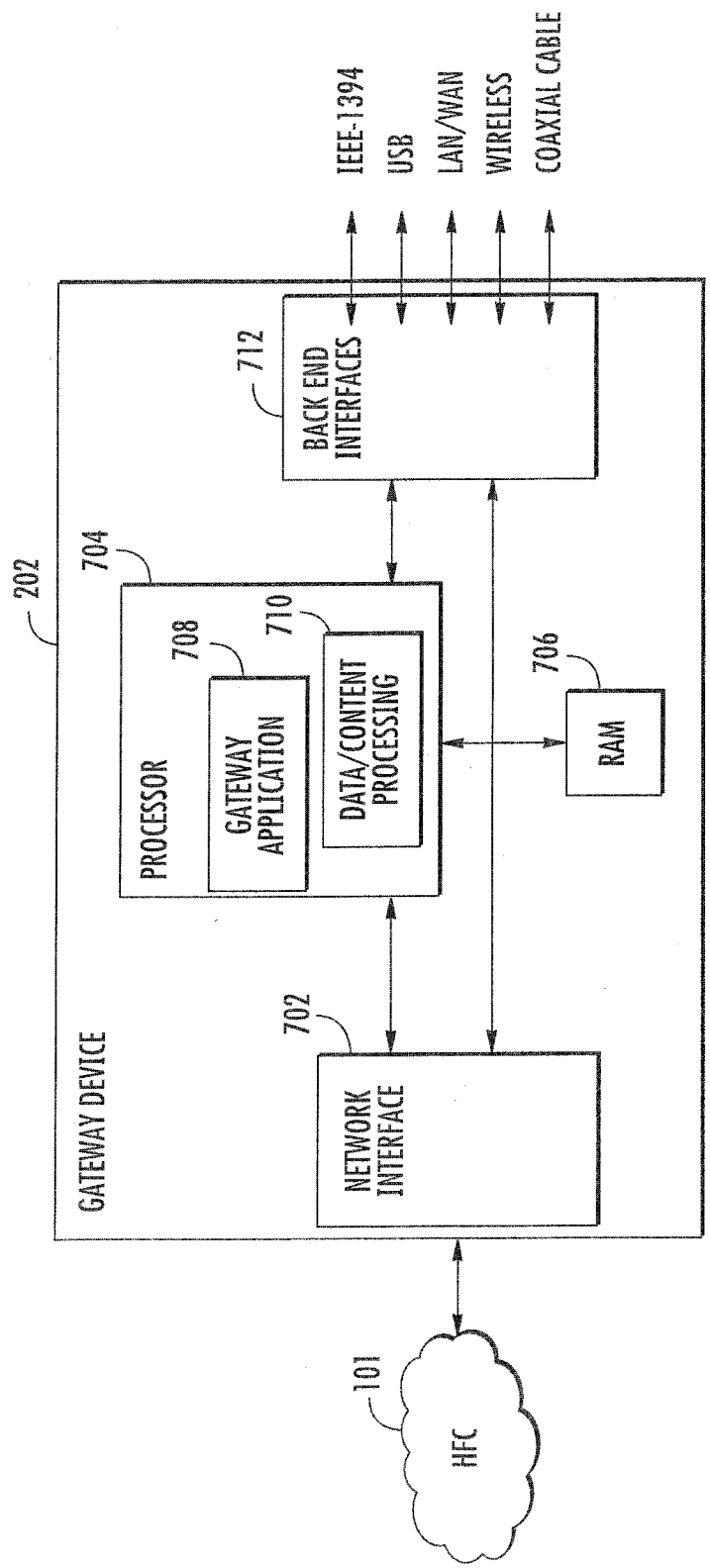
FIG. 7 is block diagram of one embodiment of a gateway device for use within the present invention.

An exemplary premises gateway device 202 is illustrated in FIG. 7. As shown, the device generally comprises an interface 702 for communication with a cable network or other distribution 101, a processor subsystem 704 with associated RAM 706, and a plurality of back end interfaces 712 for communication with other devices in a home premises. Other components which may be utilized within the device (deleted from FIG. 7 for simplicity) include various processing layers (e.g., DOCSIS MAC or DAVIC OOB channel, MPEG, etc.) as well as media processors and other specialized SoC or ASIC devices. These additional components and functionality are well known to those of ordinary skill in the cable and embedded system fields, and accordingly not described further herein. For example, the gateway 202 may include a Wi-Fi interface, video interface (e.g., HDMI or DisplayPort), "Plug n' Play" (PnP) interface, an Ethernet interface, and/or a plain old telephone service (POTS)/public switched telephone network (PSTN) interface.

A "MoCA" chipset may also be employed in the gateway device. For example, the Broadcom BCM7420 and BCM7410 video decoder SoCs with integrated MoCA technology may be used in the design. For instance, the BCM7420 includes a dual high definition 1.0/1.1+MoCA modem, a PHY device and an on-chip radio frequency (RF) transceiver. These components facilitate secure access, storage and sharing of multiple types of digital media content. Both video decoder SoCs combine inter alia 1080p/60 video quality, an integrated FireWire (1394a) media access controller (MAC) and PHY interface.

The illustrated gateway device 202 can assume literally any discrete form factor, including those adapted for desktop, floor-standing, or wall-mounted use, or alternatively may be integrated in whole or part (e.g., on a common functional basis) with other devices if desired.

The gateway device 202 of the illustrated embodiment receives signals from the network via the coaxial cable, demodulates the signals, converts the demodulated signals if required, and transmits the digital signals to a display device (e.g., television) or other apparatus (including one or more CPE 106). These signals may also be distributed via e.g., a back-end interface to DVRs, personal media devices (PMDs), and the like.

The gateway device 202 may further comprise a cable modem which receives signals from the network (or other transport such as the aforementioned WiMAX broadband link), demodulates the signals from the CMTS, converts the demodulated signals as required, and transmits the digital signals to a computerized device (e.g., personal computer) or series of computers in a premises local area network (LAN).

One exemplary embodiment of the gateway device 202 is adapted to receive channel content over in-band frequencies and internet content over DOCSIS frequencies. This can be accomplished via, e.g., use of a wideband tuner, use of multiple tuners, etc. For example, in one embodiment, the gateway device 202 comprises an RF front end including two tuners adapted to tune to prescribed in-band and DOCSIS QAMs respectively, delivered over the network 101. A wideband tuner arrangement such as that described in co-owned and co-pending U.S. patent application Ser. No. 11/013,671 entitled "Method and Apparatus for Wideband Distribution of Content" filed Dec. 15, 2004 and incorporated herein by reference in its entirety, may also be utilized, such as where the content associated with one or more program streams (or DOCSIS data streams) is distributed across two or more QAMs.

The gateway device 202 may then route the received content (after any necessary intervening processing) to the appropriate target device(s), such as a television and/or a router (for data delivery to a computer network). In yet another embodiment, the gateway device 202 may comprise a premises gateway device such as that disclosed in co-owned U.S. patent application Ser. No. 11/818,236 entitled "Premises gateway apparatus and methods for use in a content delivery network" and filed Jun. 13, 2007, now published as U.S. Patent Publication No. 2008/0313691 and issued as U.S. Pat. No. 7,954,131 on May 31, 2011, each of which is incorporated herein by reference in its entirety. As discussed therein, the gateway device 202 may act as a unified communications (e.g., OOB) interface or proxy for other components within the premises network or coupled thereto, and/or may be modified to create an authorized service domain (ASD) or trusted domain (TD) for the connected devices.

In a further embodiment, Ethernet ports or local networking protocols (e.g., X.25, etc.) may be provided for the purpose of a Home LAN connection. These interfaces may be serviced via a WLAN interface, wired RJ-45 ports, or otherwise. The gateway 202 may also include a plurality of RJ-11 ports for telephony interfaces, as well as a plurality of USB (e.g., USB 2.0 or 3.0) ports, and IEEE-1394 (Firewire) ports. S-video and other signal interfaces (e.g., HDMI, DisplayPort, etc.) may also be provided if desired.

The coaxial cable network interface 702 is coupled to a DOCSIS tuner. In the illustrated embodiment, the processor 704 is configured to run a gateway application 708 and a data/content processing application 710 thereon. The data/content processing application 710 enables analog RF signals received over the DOCSIS tuner to be demodulated (e.g., QAM-256 demodulated) and demultiplexed (and converted if required). In another embodiment, the processing application 710 may further enable security domain optical transcription.

Programming and other types of data including pictures, video, music or MP3 files, software applications, metadata files, etc. may also be received by way of the various digital interfaces in the gateway device 202. These data may be stored locally or even on a client device or network agent in communication with the gateway 202, for later use by a user.

In yet another embodiment, the data/content processing application 710 enables data to be extracted for routing to individual ones of the devices in communication with the gateway device 202 such as via the back end interfaces 712. For example, the back end interface 712 may comprise, a coaxial cable interface, an Ethernet/GBE interface with RJ-45/CAT-5, a Firewire (IEEE-1394) interface, USB interface, a wireless interface (e.g., WiFi, UWB PAN, etc.), or other. The data/content processing application may also enable upstream DOCSIS communication.

The gateway device 202 of FIG. 7 may further act as an OOB proxy for external DVR and DSTB assets, which each have their own coaxial "in-band" interface (not shown) for delivery of in-band content. This obviates the OOB tuner on each device, thereby allowing them to be simpler and manufactured more inexpensively. In one variant, communication between the various entities (e.g., DVR and DSTB and PSG OOB proxy) is accomplished using IP-based communications of the type well known in the art, although other approaches may be used with equal success.

In another embodiment, the gateway device comprises a CPD (converged premises device) of the type previously discussed herein with respect to FIG. 2a, such as for example that described in co-owned U.S. patent application Ser. No. 11/378,129 filed Mar. 16, 2006, entitled "Methods and Apparatus for Centralized Content and Data Delivery", and issued as U.S. Pat. No. 8,347,341 on Jan. 1, 2013, incorporated herein by reference in its entirety.

The gateway device 202 creates a home Local Area Network (LAN) utilizing the existing coaxial cable in the home. For example, an Ethernet-over-coax based technology allows services to be delivered to other devices in the home utilizing a frequency outside (e.g., above) the traditional cable service delivery frequencies. The gateway device 202 is then able to deliver data and content stored thereon (whether received from the cable network headend or individual ones of CPE 106 in communication therewith) to the various CPE 106 within the premises. The data and/or content may be protected content having one or more rules associated with its playback, or may be personal content created on a content rendering device.

A premises gateway software management package (application) is also provided to control, configure, monitor and provision the gateway device 202 from the cable head-end 150 or other remote network node via the cable modem (DOCSIS) interface. This control allows a remote user to configure and monitor the device 202 and the home network.

In one embodiment, the gateway device 202 also includes a MoCA, retail compliant F-connector for providing data-over-coax capability. The MoCA frequencies can be multiplexed onto the cable input port of the gateway device 202, or sent over another channel (e.g., dedicated channel or interface).

The MoCA interface of the gateway device 202 of the illustrated embodiment is compliant with MoCA standards v1.0 and v1.1. The gateway device 202 may also configured to query the number of active devices attached to the MoCA network, and provide a list or output of the active devices based on MAC address.

In one embodiment, the MoCA interface is configured within the device 202 so as to not degrade video quality when it is co-located with a tuner, or interfere with a co-located DOCSIS interface or wireless (e.g., Wi-Fi) interface. Interference is mitigated or eliminated using e.g., an exemplary EMI (Faraday) noise shield of the type well known in the art, although other approaches (including for example specific component orientation and placement, signal trace routing to mitigate EMI, etc.) may be used as well.

The gateway device 202 also optionally includes a switched packet interface between the Ethernet port and the MoCA interface. In one embodiment, data traffic flows through the gateway 202 between the Ethernet or other network interface and MoCA ports without requiring host processor (e.g., CPU) intervention.

As noted previously, the gateway device 202 may in one further embodiment be configured to transmit and/or receive data via WiMAX transport. In the context of the present invention for example, the gateway device 202 might transmit password requests destined for the configuration entity 214 via the cable network, yet receive the requested password (e.g., a MoCA password) via the WIMAX broadband interface. Alternatively, the WiMAX interface could be used to transmit the requests to the configuration entity 214 (via a WiMAX interface associated with the latter), with delivery of the requested password being via in-band RF QAMs. Various permutations of the foregoing will be recognized by those of ordinary skill given the present disclosure.

It will be noted that the foregoing description is merely exemplary in nature and that other gateway 202 configurations may be utilized consistent with the present invention.

CPE—

Figure 8:
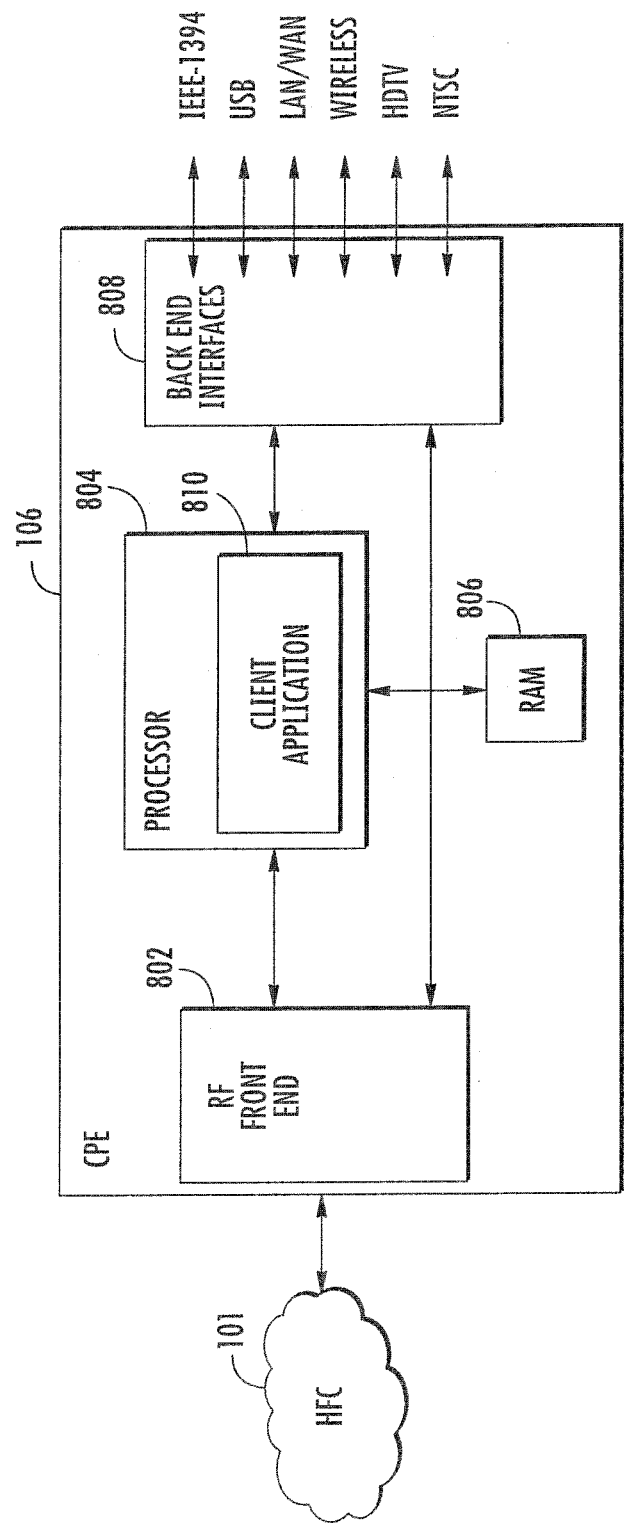
FIG. 8 is a block diagram of one embodiment of a premises device for use within the present invention.

One embodiment of a CPE apparatus 106 according to the invention is illustrated in FIG. 8. As shown, the CPE generally comprises an OpenCable (OCAP)-compliant embedded system having an RF front end 802 (including tuner and demodulator/decryptors) for interface with the HFC network 101 of FIGS. 1-1d, digital processor(s) 804, storage device 806, and a plurality of interfaces 808 (e.g., video/audio interfaces, IEEE-1394 "FireWire", USB, serial/parallel ports, etc.) for interface with other end-user apparatus such as televisions, personal electronics, computers, WiFi or other network hubs/routers, etc. Other components which may be utilized within the device (deleted from FIG. 8 for simplicity) include various processing layers (e.g., DOCSIS MAC or DAVIC OOB channel, MPEG, etc.) as well as media processors and other specialized SoC or ASIC devices. The CPE 106 may also comprise an integrated HD decoder, thereby relieving any connected monitors or other devices from the requirement of having such a decoder. These additional components and functionality are well known to those of ordinary skill in the cable and embedded system fields, and accordingly not described further herein.

The CPE 106 of FIG. 8 is also provided with an OCAP 1.0- or higher compliant application and Java-based middleware which, inter alia, manages the operation of the device and applications running thereon (including the herein described client application 810). It will be recognized by those of ordinary skill that myriad different device and software architectures may be used consistent with the tuning functions of the present invention, the device of FIG. 8 being merely exemplary. For example, different middlewares (e.g., MHP, ARIB, or ACAP) may be used in place of the OCAP middleware of the illustrated embodiment.

The exemplary CPE 106 further comprises a conventional "Watch TV" application or the like, which services those program or user channels available over the network. The Watch TV application, residing in memory, provides such functions as channel navigation control, channel selection in response to a channel change event, etc. In one embodiment, the Watch TV (or EPG) application further comprises all necessary functionality need to support the data collection client process.

As previously noted, the CPE 106 of FIG. 8 further comprises a client application 810 which, in one embodiment, is configured to receive entitlements messages from the network controller 206 and to, in response, send a password request message to the server 204. This software application may be configured to perform any number of additional functions, including without limitation: (i) identifying and communicating CPE hardware or software errors logged by the middleware; (ii) identifying and communicating new hardware or software components logged with the middleware registry, (iii) accumulating and sending CPE configuration profiles or data; and/or (iv) determining and sending MAC address, device type, or other device-specific or user-specific information (such as portions of public/private encryption keys), useful in identifying and authenticating the device and/or user.

In yet another embodiment, the CPE 106 may be configured to transmit and/or receive data via WiMAX transport. In the context of the present invention for example, the CPE 106 might transmit password requests destined for the server 204 via the cable network, yet receive the requested password (e.g., a MoCA password) via the WIMAX broadband interface. Alternatively, the WiMAX interface could be used to transmit the requests to the server 204 (via a WiMAX interface associated with the latter), with delivery of the requested password being via in-band RF QAMs. Various permutations of the foregoing will be recognized by those of ordinary skill given the present disclosure.

Furnace—

Figure 9A:
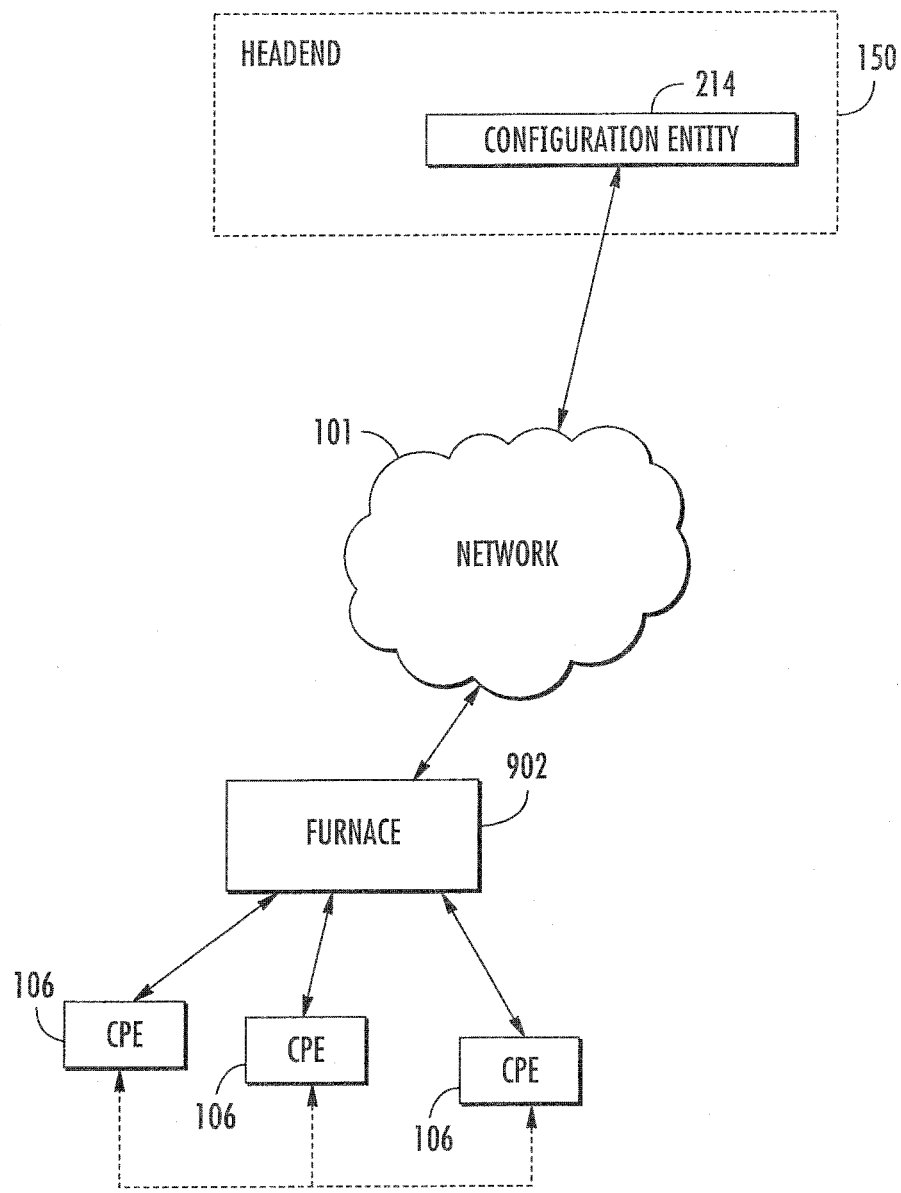
FIG. 9a is a functional block diagram illustrating yet another network architecture for providing premises networking according to the present invention.

In another embodiment, the network configuration shown in FIG. 9*a* is utilized for providing protected networking services. In the illustrated embodiment, the gateway device comprises a gateway storage device or "furnace" 902 such as that discussed in previously incorporated co-owned U.S. patent application Ser. No. 11/378,129 filed Mar. 16, 2006, issued as U.S. Pat. No. 8,347,341 on Jan. 1, 2013, and entitled "Methods and Apparatus for Centralized Content and Data Delivery". The CPE 106 of this embodiment are not in direct communication with the network (i.e., they are not part of the traditional video provisioning network), but rather, sit behind the furnace device 902, the latter which acts as an interface with the distribution network 101.

In accordance with this embodiment, a protected MoCA network is established via the aforementioned password utilization mechanisms. Specifically, a password is obtained by the furnace device 902, such as from e.g., the configuration entity 214 of the network headend 150, and is distributed within the premises to one or more CPE 106 in communication therewith, enabling a MoCA network to be established.

In one embodiment, the mechanisms by which the password is transmitted from the furnace device 902 to the CPE 106 are generally analogous to those utilized in wireless protected setup as described in Wi-Fi Protected Setup™ Specification 1.0 (Jan. 8, 2007), which is incorporated herein by reference in its entirety. For example, a premises (e.g., home) network according to the present invention may be created using a personal identification number (PIN) method, a provided-by-client (PBC) method, a near field communication (NFC) method, and/or a universal serial bus (USB) method to securely transfer the password from the furnace 902 to the CPE 106.

Figure 9B:
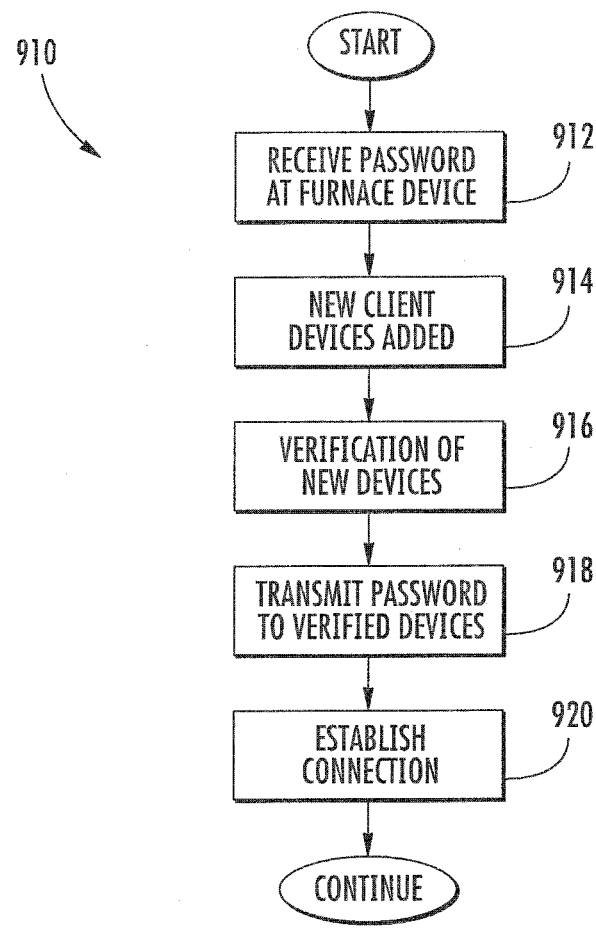

Referring now to FIG. 9*b*, one embodiment of the method 910 for establishing a premises network within the architecture of FIG. 9*a* is given. As illustrated, per step 912, the password is received at the furnace device 902. In one embodiment, the furnace 902 receives the password according to the methods disclosed above with respect to FIG. 4*a*.

Next, per step 914, one or more new client devices are added to a user's network. A new device may be detected via actual physical connection between the new device and the furnace 902 (e.g., via placing a "high" signal or sensing a voltage at a pin or terminal of a connector connecting the devices, or via a wireless negotiation or exchange between the two devices); however, it will be appreciated that alternative mechanisms for determining that a new device has entered the network may also be utilized given the disclosure above. For instance, the user may affirmatively note the existence of the new device by way of a computer GUI or other input device, or cause one device to search for "new hardware".

At step 916, the new devices are verified and/or registered to the furnace 902. Verification/registration of devices by the furnace 902 may utilize a digital certificate, a series of communications between the furnace 902 and multiple entities of the BPS 210, etc. In one embodiment, the furnace 902 compares information regarding the new devices to a database of registered devices received from the network. Alternatively, the furnace may act as an authentication proxy, and pass information regarding the new devices to a network authentication entity for verification/registration at that entity. Once a device is verified and/or registered, the furnace 902 may transmit the password thereto (step 918). Obtaining the password enables the CPE 106 to not only communicate within the MoCA network with the furnace 902, but also with other devices (e.g., CPE 106) on the MoCA network (step 920).

Business Models and Rules Engine—

In another aspect of the invention, the aforementioned apparatus and methods can be used as the basis for one or more business models.

For example, in one embodiment, the network operator (e.g., MSO of a cable network) can use the provision of premises passwords and/or premises networking capabilities described herein for consideration (e.g., monetary payments in the form of subscription fees). The amount of consideration may be based on the number of devices requiring a password, the data and/or content exchange capabilities within the premises network, or other factors. Moreover, the passwords and/or network capabilities may be given a finite lifetime and/or additional restrictions on their use (e.g., only between the hours of X and Y).

As another option, the MSO or another entity can sell or provide services that are licensed on a per-dwelling or per-unit basis, somewhat akin to prior art software "site" licensing approaches. Such an approach is also advantageously expandable, such as when more DVRs, PCs, STBs, etc. are added to a particular premises or installation.

In another aspect of the invention, a processing entity rendered as one or more computer programs disposed on a head-end server or entity (e.g., BSA hub entity, server 204, configuration entity 214, CPE 106, gateway 202, or other location) includes a so-called "rules" engine. This engine comprises, in an exemplary embodiment, one or more software routines adapted to control the operation of the network components and/or premises network in order to achieve one or more goals relating to operations or business (e.g., profit). Included within these areas are network optimization and reliability goals, increased maintenance intervals, increased subscriber or user satisfaction, increased subscription base, higher profit (e.g., from increased advertising revenues), more subscriber "views" of given content, higher data download speed, increased bandwidth and responsiveness to changing demands for bandwidth, reduction of undue QAM replication, and so forth.

These rules may comprise a separate entity or process, and may also be fully integrated within other processing entities, and controlled via e.g., a GUI on a PC connected to the relevant server. In effect, the rules engine comprises a supervisory entity which monitors and selectively controls network component and/or CPE and premises network operation processes at a higher level, so as to implement desired operational or business rules. The rules engine can be considered an overlay of sorts to the more fundamental algorithms used to accomplish required network operation, such as IP address assignment, statistical multiplexing, BSA switching, and so forth.

For example, the network may invoke certain operational protocols or decision processes based on information or requests received from the gateway or CPE, conditions existing within the network, demographic data, geographic data, etc. However, these processes may not always be compatible with higher level business or operational goals, such as maximizing profit or system reliability. Hence, when imposed, the business/operational rules can be used to dynamically (or manually) control the operation of the network components (e.g., server 204, network controller 206, BPS 210, LDAP 212, configuration entity 214) and client process on the CPE, gateway, furnace, or other devices within the premises. The rules may be, e.g., operational or business-oriented in nature, and may also be applied selectively in terms of time of day, duration, specific local areas, or even at the individual user level (e.g., via specific identification of a device via TUNER_ID, MAC address, or the like).

For example, one rule implemented by the rules engine may comprise only providing premises network (e.g., MoCA) access and/or certain networking capabilities to certain subscribers or classes of subscribers. The subscriber CPE 106 or STB 208 may possess a MoCA compliant interface, for example, but premises networking utilizing MoCA would not be made available to such subscribers unless they met certain criteria (e.g., "premium" subscription, etc.). Similarly, if the subscriber did not possess a required codec, CA keys, or network interface/adapter, the download of this missing component could be controlled to only subscribers meeting certain criteria.

Many other approaches and combinations of various operational and business paradigms are envisaged consistent with the invention, as will be recognized by those of ordinary skill when provided this disclosure.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. For use in a content delivery network, a premises network-capable device, comprising:
   a network interface for communication with said content delivery network;
   at least one premises interface for communication with a plurality of devices within a premises network;
   a storage entity; and
   a digital processor apparatus configured to execute at least one client application thereon, said application configured to, when executed:
      receive at least one entitlement message from a network controller disposed at a content delivery network headend, said entitlement message informing said premises network-capable device that said premises network-capable device is entitled to services on said premises network;
      in response to said receipt of said entitlement message, send a request for a premises network password to a server disposed at the content delivery network headend;
      receive said premises network password from said server, said received premises network password comprising one or more restrictions associated therewith;
      identify at least two devices of said plurality of devices within said premises network which are also entitled to receive services on said premises network; and
      transmit said premises network password to said identified at least two devices, said transmission enabling communication to be established within said premises network between said identified at least two devices;

wherein said communication established within said premises network enables media content and associated metadata to be shared between said identified at least two devices for a certain duration via said premises network, said certain duration based at least in part on said one or more restrictions;

wherein said received premises network password comprises a password generated by said server via use of at least user account information as seed information for an algorithm, said user account information associated with at least one of said identified at least two devices.

2. The premises network-capable device of claim 1, wherein said premises network comprises a Multimedia over Coaxial Alliance (MoCA)-compliant network utilizing coaxial cable.

3. The premises network-capable device of claim 1, wherein said network interface comprises an radio frequency (RF) tuner apparatus.

4. The premises network-capable device of claim 1, wherein said entitlement message comprises a server address where said password is located, said request being sent to said server address.

5. The premises network-capable device of claim 1, wherein said request for said premises network password comprises information uniquely identifying said premises network-capable device.

6. The premises network-capable device of claim 5, wherein said information uniquely identifying said premises network-capable device comprises a media access control (MAC) address of said premises network-capable device.

7. The premises network-capable device of claim 1, wherein said received entitlement message is issued in response to a negotiation sequence between said premises network-capable device and said content delivery network initiated by detection of said premises network-capable device on said premises network.

8. A server apparatus disposed at a content distribution network headend, the server apparatus comprising:
a network interface;
a storage apparatus; and
a processor apparatus in data communication with said network interface and said storage apparatus, said processor apparatus configured to execute at least a software application thereon, said software application configured to:
receive, from a premises-capable device in communication with said network interface, a password request to gain access to a premises network;
utilize information in said password request to:
verify that said premises-capable device is entitled to access said premises network; and
query a first database for user account information associated with said premises-capable device;
utilize said user account information to query a second database for a password;
when said query of said second database does not return said password, use at least said user account information as seed information for an algorithm configured to generate said password, said password comprising one or more restrictions associated therewith; and
transmit said password to said premises-capable device via said network interface;
in response to an identification of at least two devices within said premises network which are also entitled to access said premises network, cause transmission of said password to said identified at least two devices, thereby enabling said identified at least two devices to access said premises network and to share content with one another for a certain duration via the premises network, said certain duration based at least in part on said one or more restrictions.

9. The server apparatus of claim 8, wherein said first database comprises a database associated with a billing system of said content distribution network.

10. The server apparatus of claim 8, wherein said second database comprises a database associated with a broadcast provisioning system of said content distribution network.

11. A method of operating a premises device, the method comprising:
placing said premises device in data communication with a premises network, at least one component of said premises network being in communication with a content distribution network;
substantially in response to said act of placing, causing said premises device to automatically:
receive at least one entitlement message from a network controller disposed at a headend of said content distribution network, said entitlement message configured to inform said premises device that said premises device is entitled to services on said premises network;
in response to said receipt of said entitlement message, send a request for a security to a server disposed at said headend of said content delivery network;
receive said security information from said content distribution network, said security information comprising one or more restrictions associated therewith;
utilize said security information to gain access to one or more features of said premises network; and
determine that another premises device is in communication with said premises network, said determination comprising a detection of said another premises device via a physical connection; and
upon authentication of said another premises device, transmit said security information to said another premises device, said transmission configured to enable said premises device to share content and associated metadata with said another premises device for a certain duration via the premises network, said certain duration based at least in part on said one or more restrictions;
wherein said security information comprises a password generated by a server apparatus via use of at least user account information as seed information for an algorithm, said user account information associated with at least said premises device.

12. The method of claim 11, further comprising causing, substantially in response to said act of placing, said premises device to obtain a network address on said premises network.

13. The method of claim 12, wherein said network address on said premises network comprises an address generated via network address translation (NAT).

14. The method of claim 12, wherein said premises network comprises a trusted network.

15. The method of claim 11, wherein said detection via said physical connection comprises placing a signal or sensing a voltage at a pin or terminal of a connector connecting said premises device to said another premises device.

16. The method of claim 11, wherein said detection via said physical connection comprises a wireless negotiation or exchange between said premises device and said another premises device.

17. A non-transitory computer-readable apparatus comprising media configured to store a computer program thereon, said computer program comprising a plurality of instructions which are configured to, when executed by a processor apparatus:
- receive at least one entitlement message from a network controller disposed at a content delivery network head-end, said entitlement message configured to indicate that a premises network-capable device is entitled to services on a premises network;
- in response to said receipt of said entitlement message, send a request for a premises network password to a server disposed at said content delivery network head-end;
- receive said premises network password from said server, said received premises network password comprising one or more restrictions associated therewith;
- identify at least two client devices within said premises network which are also entitled to receive services on said premises network; and
- transmit said premises network password to said identified at least two devices, said transmission enabling communication to be established within said premises network between said identified at least two devices;
- wherein said communication established within said premises network enables media content and associated metadata to be shared between said identified at least two devices for a certain duration via said premises network, said certain duration based at least in part on said one or more restrictions; and
- wherein said received premises network password comprises a password generated by said server via use of at least user account information as seed information for an algorithm, said user account information associated with said identified at least two devices.

18. The non-transitory computer-readable apparatus of claim 17, wherein said request for said premises network password comprises information uniquely identifying said premises network-capable device.

19. The non-transitory computer-readable apparatus of claim 18, wherein said information uniquely identifying said premises network-capable device comprises a media access control (MAC) address of said premises network-capable device.

20. The non-transitory computer-readable apparatus of claim 17, wherein said received entitlement message is issued in response to a negotiation sequence between said premises network-capable device and said content delivery network initiated by detection of said premises network-capable device on said premises network.

21. The non-transitory computer-readable apparatus of claim 17, further comprising causing said premises network-capable device to obtain a network address on said premises network, wherein said network address on said premises network comprises an address generated via network address translation (NAT).

22. The non-transitory computer-readable apparatus of claim 17, wherein said premises network comprises a Multimedia over Coaxial Alliance (MoCA)-compliant network utilizing coaxial cable.

* * * * *